(12) United States Patent
Tada et al.

(10) Patent No.: US 10,698,183 B2
(45) Date of Patent: Jun. 30, 2020

(54) IMAGING OPTICAL SYSTEM

(71) Applicant: HOYA CORPORATION, Tokyo (JP)

(72) Inventors: Eijiroh Tada, Saitama (JP); Yutaka Takakubo, Saitama (JP)

(73) Assignee: HOYA CORPORATION, Tokyo (JP)

( * ) Notice: Subject to any disclaimer, the term of this patent is extended or adjusted under 35 U.S.C. 154(b) by 111 days.

(21) Appl. No.: 16/165,272

(22) Filed: Oct. 19, 2018

(65) Prior Publication Data
US 2019/0121095 A1 Apr. 25, 2019

(30) Foreign Application Priority Data

Oct. 23, 2017 (JP) ................. 2017-204407

(51) Int. Cl.
| | | |
|---|---|---|
| G02B 9/60 | (2006.01) | |
| G02B 13/00 | (2006.01) | |
| G02B 9/64 | (2006.01) | |
| G02B 9/62 | (2006.01) | |
| G02B 13/04 | (2006.01) | |
| G02B 5/00 | (2006.01) | |

(52) U.S. Cl.
CPC .......... *G02B 13/0045* (2013.01); *G02B 9/60* (2013.01); *G02B 9/62* (2013.01); *G02B 9/64* (2013.01); *G02B 13/04* (2013.01); *G02B 5/005* (2013.01)

(58) Field of Classification Search
CPC ...... G02B 13/0045; G02B 9/62; G02B 5/005; G02B 13/04; G02B 9/60; G02B 9/64
USPC .......................... 359/713, 717, 740, 753, 793
See application file for complete search history.

(56) References Cited

U.S. PATENT DOCUMENTS

| | | | |
|---|---|---|---|
| 6,867,933 B2* | 3/2005 | Matsusaka | G02B 9/58 359/715 |
| 8,335,043 B2 | 12/2012 | Huang | |
| 10,082,648 B2 | 9/2018 | Usui et al. | |
| 10,131,278 B2* | 11/2018 | Nagano | B60R 1/00 |
| 2004/0257677 A1 | 12/2004 | Matsuzaka | |
| 2014/0118849 A1* | 5/2014 | Mori | G02B 13/004 359/715 |
| 2018/0149838 A1 | 5/2018 | Takakubo et al. | |

FOREIGN PATENT DOCUMENTS

| | | |
|---|---|---|
| JP | 2004-354572 A | 12/2004 |
| JP | 2005-010521 A | 1/2005 |

* cited by examiner

*Primary Examiner* — Evelyn A Lester
(74) *Attorney, Agent, or Firm* — Greenblum & Bernstein, P.L.C.

(57) ABSTRACT

The object-side surface of a negative lens element closest to the object side within a first lens group includes a paraxial convex surface and a peripheral surface having a curvature less than that of the paraxial surface. The image-side surface of a last lens element of a second lens group includes a paraxial concave surface and a peripheral surface having an inflection point changing from positive to negative values. $0.10 < La/TL < 0.31$, and $0.35 < Bh < 0.70$ are satisfied; La: distance from the object-side surface of the negative lens element, closest to the object side, to an axial light-bundle restriction diaphragm closest to the object side; TL: distance from the object-side surface of this negative lens element to an imaging surface; Bh: height to an inflection point on the image side of the lens element closest to the image side divided by the effective radius thereof.

9 Claims, 8 Drawing Sheets

FNO.=1:1.60    Y=4.032    Y=4.032    Y=4.032

— D Line
----- g Line
— - — C Line

— S
--- M

-0.05   0.05    -0.01   0.01    -0.05   0.05    -50.0   50.0%

SPHERICAL    LATERAL    ASTIGMATISM    DISTORTION
ABERRATION   CHROMATIC
CHROMATIC    ABERRATION
ABERRATION

SPHERICAL ABERRATION CHROMATIC ABERRATION

LATERAL CHROMATIC ABERRATION

ASTIGMATISM

DISTORTION

SPHERICAL ABERRATION CHROMATIC ABERRATION   LATERAL CHROMATIC ABERRATION   ASTIGMATISM   DISTORTION

SPHERICAL ABERRATION CHROMATIC ABERRATION

LATERAL CHROMATIC ABERRATION

ASTIGMATISM

DISTORTION

FNO.=1:1.46   Y=4.032   Y=4.032   Y=4.032

— D Line
- - - g Line
– - – C Line

— S
- - - M

-0.05  0.05   -0.01  0.01   -0.05  0.05   -50.0  50.0%

SPHERICAL      LATERAL        ASTIGMATISM    DISTORTION
ABERRATION     CHROMATIC
CHROMATIC      ABERRATION
ABERRATION

IMAGING OPTICAL SYSTEM

BACKGROUND OF THE INVENTION

1. Field of the Invention

The present disclosure relates to an imaging optical system (wide-angle imaging lens system) that can be installed in an imaging apparatus such as, e.g., an on-board camera, a surveillance camera, and a camera in a portable terminal.

2. Description of Related Art

In recent years, devices that use a camera mounted on or in a motor vehicle to recognize surrounding objects, apply an automatic brake if a collision is anticipated, or to follow a vehicle traveling in front of the motor vehicle have become commonplace. There is a demand for such on-board cameras to not only have surveillance capabilities in front of the vehicle, but also surveillance capabilities for a wider range in forward diagonal directions in which sidewalks (footpaths) and intersections can be captured. A wide-angle lens system is used to carry out surveillance over a wider range; however, a typical (conventional) wide-angle lens system has a small magnification, which risks a reduction in object recognition precision. In particular, since a high detection precision is demanded at a central area in which a vehicle in front or an on-coming vehicle is located, it is preferable to obtain a large image. Therefore, there is a demand for the on-board camera to be capable of capturing (shooting) a wide range/area while capturing a large image at the central area of the image.

Japanese Unexamined Patent Publication No. 2004-354572 (herein "Patent Publication 1") discloses an imaging apparatus provided with a compact image input optical system that employs a projection method that enlarges the object image at the central area of the picture screen and does not need a complex arrangement or configuration such as a zoom optical system or a superwide angle lens system. Japanese Unexamined Patent Publication No. 2005-10521 (herein "Patent Publication 2") discloses an imaging apparatus provided with a large-aperture, compact, high quality imaging lens that utilizes the advantages of the fovea lens.

However, in the imaging apparatuses disclosed in Patent Publications 1 and 2, the diameter of the first lens provided closest to the object side is large, and the degree of retroflection on the peripheral profile on the surface on the object side of the first lens is large. Since the on-board camera (optical system) is typically provided at the top of the front windscreen of the motor vehicle at a position very close to the inner side of the front windshield (windscreen), if the diameter and the retroflection of the first lens are large, the lens unit increases in size and thereby obstructs the view of the driver of the motor vehicle and clutters the spatial interior of the motor vehicle.

SUMMARY OF THE INVENTION

The imaging optical system of present disclosure has been devised in view of the above-described problems and can achieve a wide-angle, enlarges the object image at the central area of the picture screen, achieves miniaturization of the first lens element provided closest to the object side, and hence miniaturizes the entire lens unit (in which the imaging optical system is provided), and can favorably correct various aberrations.

According to an aspect of the imaging optical system, an imaging optical system is provided, including a negative first lens group, at least one axial light-bundle restriction diaphragm, and a positive second lens group, in that order from the object side. The first lens group includes a negative lens element provided closest to the object side. A surface on the object side of the negative lens element, provided closest to the object side within the first lens group, includes a paraxial convex surface convexing toward the object side and includes a peripheral surface having a curvature that is less than the curvature of the paraxial convex surface. A surface on the image side of the lens element, provided closest to the image side within the second lens group, includes a paraxial concave surface concaving toward the image side and includes a peripheral surface having an inflection point that changes from a positive value of the curvature of the paraxial concave surface to a negative value. The following conditions (1) and (2) are satisfied:

$0.10 < La/TL < 0.31$ ... (1), and $0.35 < Bh < 0.70$ ... (2), wherein La designates a distance along the optical axis from the surface on the object side of the negative lens element, provided closest to the object side within the first lens group, to the axial light-bundle restriction diaphragm that is provided closest to the object side, TL designates a distance along the optical axis from the surface on the object side of the negative lens element, provided closest to the object side within the first lens group, to an imaging surface, and Bh designates a value of a height from an optical axis to a point of inflection on the image side surface of a lens element that is provided closest to the image side within the second lens group, divided by the effective radius of the image side surface of the lens element that is provided closest to the image side.

In the present disclosure, in addition to the case where a diaphragm (axial light-bundle restriction diaphragm) is positioned between a surface closest to the image side on the first lens group and a surface closest to the object side on the second lens group, "a first lens group, a diaphragm and a second lens group, in that order from the object side (in other words, a diaphragm is provided between the first lens group and the second lens group)" also refers to the case where the diaphragm is positioned on a plane that is orthogonal to the optical axis and is tangent to the surface closest to the image side on the first lens group, or at a position that is slightly toward the object side from such a plane so that the diaphragm and the first lens group overlap with respect to the optical axis direction; and also refers to the case where the diaphragm is positioned on a plane that is orthogonal to the optical axis and is tangent to the surface closest to the object side on the second lens group, or at a position that is slightly toward the image side from such a plane so that the diaphragm and the second lens group overlap with respect to the optical axis direction. The same interpretation can also applied to the case where a diaphragm (axial light-bundle restriction diaphragm) is positioned between adjacent lens elements within the same lens group.

In the present disclosure, "effective radius (effective aperture) of a lens element" refers to the maximum light-ray passage area of the lens element determined by light rays that pass through the lens element at a maximum position (distance) from the optical axis out of the light rays from the center (on the optical axis) of an image, formed by an optical system that includes the lens element, to the maximum image height (the distance from the optical axis to the intersection point between the light rays and the lens optical surface).

It is desirable for the following conditions (3), (4) and (5) to be satisfied:

$0.5 < Apv*Ha < 1.5$ ... (3), $0.45 < Bpv*Hb < 1.90$ ... (4), and $0.45 < \text{Apv}/\text{Bpv} < 1.25$ ... (5), wherein Apv designates an amount of curvature change in the meridional plane within the effective aperture of the surface on the object side of the negative lens element that is provided closest to the object side within the first lens group; Bpv designates an amount of curvature change in the meridional plane within the effective aperture of the surface on the image side of the lens element that is provided closest to the image side within the second lens group; Ha designates the effective radius of the surface on the object side of the negative lens element that is provided closest to the object side within the first lens group; and Hb designates the effective radius of the surface on the image side of the lens element that is provided closest to the image side within the second lens group.

The term "amount of curvature change" in this context refers to the difference between the maximum curvature and the minimum curvature (maximum curvature−minimum curvature) within the effective aperture of each lens surface.

It is desirable for the following condition (6) to be satisfied:

$0.035 < \text{L1D}/\text{TL} < 0.12$ (6), wherein L1D designates a thickness along the optical axis of the negative lens element that is provided closest to the object side within the first lens group, and TL designates a distance along the optical axis from the surface on the object side of the negative lens element, provided closest to the object side within the first lens group, to an imaging surface.

It is desirable for a negative lens element including a concave surface on the object side, and having a negative refractive power that is weaker than that of the negative lens element that is provided closest to the object side within the first lens group, to be provided on the image side of the negative lens element that is provided closest to the object side within the first lens group.

The first lens group can consist of a negative lens element and a negative lens element, in that order from the object side, and the second lens group can consist of a positive lens element, a positive lens element, a negative lens element, a positive lens element and a positive lens element, in that order from the object side.

The first lens group can consist of a negative lens element, a negative lens element and a positive lens element, in that order from the object side, and the second lens group can consist of a positive lens element, a negative lens element, a positive lens element and a positive lens element, in that order from the object side.

The negative lens element on the image side within the first lens group, and the positive lens element within the first lens group can be cemented to each other.

The first lens group can consist of a negative single lens element, and the second lens group can consist of a negative lens element, a positive lens element, a positive lens element, a negative lens element, a positive lens element and a positive lens element, in that order from the object side.

It is desirable for the negative lens element provided closest to the object side within the second lens group and the positive lens element, which is the second lens element within the second lens group, to be cemented to each other.

Accordingly, an imaging optical system can be obtained which achieves a wide-angle, enlarges the object image at the central area of the picture screen, achieves miniaturization of the first lens element provided closest to the object side, and hence miniaturizes the entire lens unit, and can favorably correct various aberrations.

The present disclosure relates to subject matter contained in Japanese Patent Application No. 2017-204407 (filed on Oct. 23, 2017) which is expressly incorporated herein in its entirety.

BRIEF DESCRIPTION OF THE DRAWINGS

The imaging optical system of the present disclosure will be discussed below in detail with reference to the accompanying drawings, in which.

DESCRIPTION OF THE EMBODIMENTS

Figures 1, 2A, 2B, 2C, 2D:
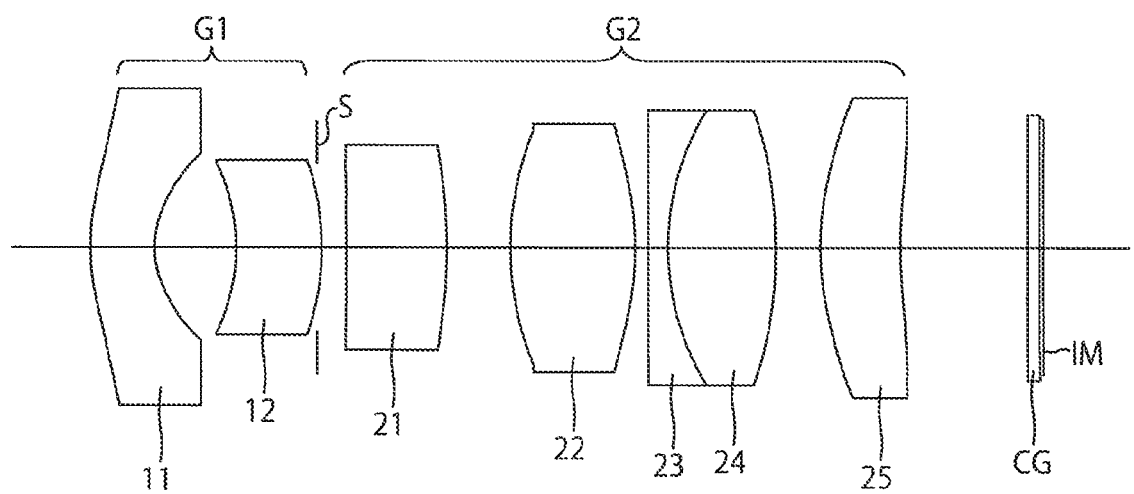
FIG. 1 shows a lens arrangement of a first numerical embodiment of the imaging optical system.
FIGS. 2A, 2B, 2C and 2D show various aberrations that occurred in the lens arrangement of FIG. 1.

The imaging optical system is configured of a negative first lens group G1, a diaphragm (axial light-bundle restriction diaphragm, aperture diagram) S, and a positive second lens group G2, in that order from the object side. A cover glass CG is provided between the second lens group G2 and an imaging surface IM. A second diaphragm (not shown) may be provided between the diaphragm S and the second lens group G2. This second diaphragm may be an axial light-bundle restriction diaphragm and or may by an abaxial light-bundle restriction diaphragm.

More specifically, in the imaging optical system in the illustrated embodiments, one axial light-bundle restriction diaphragm is provided between the first lens group G1 and the second lens group G2 in first through fifth, seventh and eighth numerical embodiments, and two axial light-bundle restriction diaphragms are provided between the first lens group G1 and the second lens group G2 in the sixth numerical embodiment. At least one axial light-bundle restriction diaphragm is required to be provided between the first lens group G1 and the second lens group G2, and, e.g., three or more axial light-bundle restrictions may be provided.

In each of the first through fourth numerical embodiments, the first lens group G1 is configured of a negative lens element 11 and a negative lens element 12, in that order from the object side. An aspherical surface is formed on each side of the negative lens element 11.

In each of the fifth and sixth numerical embodiments, the first lens group G1 is configured of a negative lens element 11', a negative lens element 12' and a positive lens element 13', in that order from the object side. An aspherical surface is formed on each side of the negative lens element 11'. The negative lens element 12' and the positive lens element 13' are cemented to each other.

In each of the seventh and eighth numerical embodiments, the first lens group G1 is configured of a negative single lens element 11". An aspherical surface if formed on each side of the negative single lens element 11".

In each of the first through fourth numerical embodiments, the second lens group G2 is configured of a positive lens element 21, a positive lens element 22, a negative lens element 23, a positive lens element 24 and a positive lens element 25, in that order from the object side. An aspherical surface is formed on each side of the positive lens element 22, and an aspherical surface is formed on each side of the positive lens element 25. The negative lens element 23 and the positive lens element 24 are cemented to each other.

In each of the fifth and sixth numerical embodiments, the second lens group G2 is configured of a positive lens element 21', a negative lens element 22', a positive lens element 23', and a positive lens element 24', in that order from the object side. An aspherical surface is formed on each side of the positive lens element 21', and an aspherical surface is formed on each side of the positive lens element 24'. The negative lens element 22' and the positive lens element 23' are cemented to each other.

In each of the seventh and eighth numerical embodiments, the second lens group G2 is configured of a negative lens element 21", a positive lens element 22", a positive lens element 23", a negative lens element 24", a positive lens element 25" and a positive lens element 26", in that order from the object side. An aspherical surface is formed on each side of the positive lens element 23", and an aspherical surface is formed on each side of the positive lens element 26". The negative lens element 21" and the positive lens element 22" are cemented to each other, and the negative lens element 24" and the positive lens element 25" are cemented to each other.

The imaging optical system of the illustrated embodiments achieves miniaturization of the first lens element (lens elements 11, 11' and 11"), positioned closest to the object side, and hence the entire lens unit thereof is miniaturized. A value that is the effective aperture of the first lens element divided by the maximum effective aperture out of the remaining lens elements (of the entire imaging optical system) is used as an indicator for the above-mentioned miniaturization. The smaller this value is, the smaller the effective aperture of the first lens element is out of the lens elements that constitute the imaging optical system. This value (miniaturization indicator) when applied to the imaging optical systems disclosed in the above-mentioned Patent Publications 1 and 2 is in a range of 1.25 through 2.30, whereas this value (miniaturization indicator) when applied to the imaging optical system according to the illustrated embodiments is in a range of 0.75 through 1.19. Accordingly, it is understood that the imaging optical system according to the illustrated embodiments achieves a more miniaturized first lens element, and hence a more miniaturized lens unit.

In order to enlarge the object image at the central area of the picture screen while achieving a wide angle-of-view, it is necessary to lengthen the focal length which determines the magnification at the central area of the picture screen, and to collect more light at a wider angle-of-view. Hence, in the imaging optical system of the illustrated embodiments, the first lens element that is positioned closest to the object side is configured to have a negative refractive power, and is configured to have a lens profile in which the object side of the first lens element includes a paraxial surface that is a convex surface facing the object side (the paraxial surface curvature has a positive value) and includes a peripheral portion that has a smaller curvature than that of the paraxial surface thereof. By configuring the first lens element to have a negative refractive power, light at a wide angle-of-view can be favorably collected. By forming the paraxial surface on the object side of the first lens element as a convex surface facing the object side, the magnification at the central area of the picture screen can be enlarged. By forming the object side of the first lens element to have a smaller curvature at the peripheral portion thereof compared to the central portion (paraxial surface) thereof, both miniaturization and a wider angle-of-view can be achieved.

It should be noted that upon the curvature of the surface on the object side of the first lens element decreasing from the central portion to the peripheral portion thereof, the curvature thereof may increase thereafter (however, in such a case the curvature at the central portion of is the greatest). Furthermore, the reduced value of curvature at the peripheral portion of the surface on the object side of the first lens element may change from the positive value of the paraxial curvature to a negative value.

The surface closest to the image side of the last lens element (positive lens elements 25, 24' and 26") within the second lens group G2 has a lens profile in which the paraxial surface on the image side is a concave surface (the paraxial curvature is a positive value) and in which a point of inflection is included in the peripheral portion (of the surface closest to the image side) that changes from the positive value of the paraxial curvature to a negative value.

Condition (1) specifies a ratio of the distance along the optical axis between the surface on the object side of the first lens element (negative lens elements 11, 11' and 11"), provided closest to the object side within the first lens group G1, and the diaphragm (the axial light-bundle restriction diaphragm that is positioned closest to the object side) S to the distance along the optical axis between the surface on the object side of the first lens element (negative lens elements 11, 11' and 11"), provided closest to the object side within the first lens group G1, and the imaging surface IM. By satisfying condition (1), the diaphragm S that restricts the axial light bundle can be provided at an optimum position for miniaturizing the first lens element, and distortion can be favorably controlled.

If the upper limit of condition (1) is exceeded, the position of the diaphragm (the diaphragm that is positioned closed to the object side) S becomes too distant from the first lens element (becomes too close to the imaging surface IM), so that since the abaxial light bundle passes through the first lens element at a position that is far from the optical axis, the diameter of the first lens element needs to be enlarged.

If the lower limit of condition (1) is exceeded, the position of the diaphragm (the diaphragm that is positioned closed to the object side) S becomes too close to the first lens element (becomes too distant from the imaging surface IM), so that the overlapping of light rays at different angles-of-view at the surface on the object side of the first lens element increases, thereby making it difficult to control distortion.

Condition (2) specifies a value of the height from the optical axis to a point of inflection on the image side surface of the last lens element (positive lens elements 25, 24' and 26"), provided closest to the image side within the second lens group G2, divided by the effective radius of the last lens element. By changing the curvature from a positive value to a negative value at a position partway along from a central portion to a peripheral portion on the image side surface of the last lens element (determining the point of inflection at an optimum position) so that condition (2) is satisfied, the light bundle that passes through the lens peripheral portion can be bent closer toward the optical axis, and a wider angle-of-view can be advantageously achieved. Furthermore, distortion can be favorably controlled, the lens diameter and thickness of the first lens element in the first lens group G1 can be reduced, and deterioration in optical quality can be reduced if decentration has occurred in the last lens element.

If the upper limit of condition (2) is exceeded, it becomes difficult to widen the angle-of-view and control distortion, and the lens diameter and thickness of the first lens element in the first lens group G1 increase.

If the lower limit of condition (2) is exceeded, since the lens profile in the central vicinity on the image side of the last lens element changes suddenly, deterioration in optical quality increases if decentration has occurred in the last lens element.

Condition (3) specifies the product of the amount of curvature change (in 1/mm units) in the meridional plane within the effective aperture of the surface on the object side of the first lens element (negative lens elements 11, 11' and 11") closest to the object side within the first lens group G1, and the effective radius of the surface on the object side of the first lens element (negative lens elements 11, 11' and 11") closest to the object side within the first lens group G1. The term "amount of curvature change" in this context refers to the difference between the maximum curvature and the minimum curvature (maximum curvature−minimum curvature) within the effective aperture of the surface on the object side of the first lens element (negative lens elements 11, 11' and 11"), provided closest to the object side with in the first lens group G1. By satisfying condition (3), a wide angle-of-view can be achieved and deterioration in optical quality that may occur due to decentration occurring can be suppressed.

If the upper limit of condition (3) is exceeded, the change in the profile of the optical surface of the first lens element becomes too great so that deterioration in the optical quality due to decentration occurring increases.

If the lower limit of condition (3) is exceeded, the change in curvature of the first lens element becomes too small, so that the widened angle-of-view is insufficient.

Condition (4) specifies the product of the amount of curvature change (in 1/mm units) in the meridional plane within the effective aperture of the surface on the image side of the last lens element (positive lens elements 25, 24' and 26") closest to the image side within the second lens group G2, and the effective radius of the surface on the image side of the last lens element (positive lens elements 25, 24' and 26") closest to the image side within the second lens group G2. The term "amount of curvature change" in this context refers to the difference between the maximum curvature and the minimum curvature (maximum curvature−minimum curvature) within the effective aperture of the surface on the image side of the last lens element (positive lens elements 25, 24' and 26"), provided closest to the image side with in the second lens group G2. By satisfying condition (4), a wide angle-of-view can be achieved and deterioration in optical quality that may occur due to decentration occurring can be suppressed.

If the upper limit of condition (4) is exceeded, the change in the profile of the optical surface of the last lens element becomes too great so that deterioration in optical quality due to decentration occurring increases.

If the lower limit of condition (4) is exceeded, the change in curvature of the last lens element becomes too small, so that that the widened angle-of-view is insufficient.

Condition (5) specifies the ratio of the amount of curvature change (in 1/mm units) in the meridional plane within the effective aperture of the surface on the object side of the first lens element (negative lens elements 11, 11' and 11") closest to the object side within the first lens group G1, and the amount of curvature change (in 1/mm units) in the meridional plane within the effective aperture of the surface on the image side of the last lens element (positive lens elements 25, 24' and 26") closest to the image side within the second lens group G2. By satisfying condition (5), the role of the first lens element and the last lens element in widening the angle-of-view and controlling distortion can be optimally shared, and the lens diameters and thicknesses of the first lens element and the last lens element can be reduced.

If the upper limit of condition (5) is exceeded, the burden on the first lens element for widening the angle-of-view and controlling distortion becomes too great, so that the lens diameter and thickness of the first lens element increases.

If the lower limit of condition (5) is exceeded, the burden on the last lens element for widening the angle-of-view and controlling distortion becomes too great, so that the lens diameter and thickness of the last lens element increases.

Condition (6) specifies the ratio of the thickness (distance) along the optical axis of the first lens element (negative lens elements 11, 11' and 11") closest to the object side within the first lens group G1, to the distance along the optical axis between the surface on the object side of the first lens element (negative lens elements 11, 11' and 11") closest to the object side within the first lens group G1 and the imaging surface IM. By satisfying condition (6), miniaturization of the lens unit (in which the imaging optical system is installed) can be achieved and the manufacture of the first lens element can be facilitated.

If the upper limit of condition (6) is exceeded, the lens thickness of the first lens element becomes too large, thereby enlarging the lens unit.

If the lower limit of condition (6) is exceeded, the lens thickness of the first lens element becomes too small, thereby making it difficult to manufacture the first lens element.

In the imaging optical system in the illustrated embodiments, a second lens element (negative lens elements 12, 12' and 21") having a negative refractive power that is weaker than that of the first lens element and has a concave surface on the object side is provided on the image side of the first lens element (negative lens elements 11, 11' and 11") that is closest to the object side within the first lens group G1. If the burden of the negative refractive power is only on the first lens element, since the first lens element ends up having a large amount of curvature change in the lens profile thereof, deterioration in optical quality increases if decentration has occurred; however, if the burden of the negative refractive power is shared with the second lens element, susceptibility to decentration in the first lens element can be reduced. Furthermore, by making the negative refractive power of the second lens element weaker than the negative refractive power of the first lens element, the first lens element can be miniaturized. If the negative refractive power of the second lens element is too strong, the diameter of the first lens element becomes large due to abaxial light rays bending sharply at the second lens element. Furthermore, by forming the second lens element to have a profile that has a concave surface on the object side, coma can be favorably corrected.

The imaging optical system of the illustrated embodiments is configured of seven lens elements, i.e., a negative lens element, a negative lens element, a positive lens element, a positive lens element, a negative lens element, a positive lens element and a positive lens element, in that order from the object side, when viewed as an entire optical system regardless of where the first lens group G1 and the second lens group G2 are divided (regardless of where the diaphragm S is located). The imaging apparatuses disclosed in the above-mentioned Patent Publications 1 and 2 are configured of four to six lens elements and has a dark (slow) f-number of 1.8 through 2.8, whereas the imaging optical system in the illustrated embodiments has a large aperture with a bright (fast) f-number of 1.46 through 1.6, and can favorably correct the various aberrations.

In the imaging optical system of the illustrated embodiments, by providing at least one diaphragm S that restricts theaxial light-bundle in between the first lens group G1 and the second lens group G2, miniaturization of the first lens element (negative lens element 11, 11' and 11") provided closest to the object side within the first lens group G1, and hence the entire lens unit, can be achieved.

In each of the fifth and sixth numerical embodiments of the imaging optical system, the negative lens element 12' and the positive lens element 13' within the first lens group G1 are cemented to each other (form a cemented lens). Accordingly, deterioration in optical quality that occurs due to decentration of the negative lens element 12' and/or the positive lens element 13' with respect to the negative lens element 11' can be suppressed.

In each of the seventh and eighth numerical embodiments of the imaging optical system, the negative lens element 21" and the positive lens element 22" within the second lens group G2 are cemented to each other (form a cemented lens). Accordingly, deterioration in optical quality that occurs due to decentration of the negative lens element 21" and/or the positive lens element 22" with respect to the negative lens element 11" can be suppressed.

Numerical Embodiments

Specific first through eighth numerical embodiments will be herein discussed. In the aberration diagrams and the tables, the d-line, g-line and C-line show aberrations at their respective wave-lengths; S designates the sagittal image, M designates the meridional image, f designates the focal length of the entire optical system, FNO. designates the f-number, W designates the half angle of view)(°), Y designates the image height (maximum image height), r designates the radius of curvature (paraxial radius of curvature), d designates the lens thickness or distance between lenses, N(d) designates the refractive index at the d-line, and vd designates the Abbe number with respect to the d-line. The "effective aperture" indicated in the lens data indicates a radius (the distance from the optical axis). The focal lengths (refractive powers) of lens elements that constitute a cemented lens are separately indicated into positive and negative, and their respective values, as if they are not cemented.

An aspherical surface which is rotationally symmetrical about the optical axis is defined as:

$$x=cy^2/(1+[1-\{+K\}c^2y^2]^{1/2})+A4y^4+A6y^6+A8y^8+A10y^{10}+A12y^{12}\ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIGS. 1 through 2D and Tables 1 through 5 show a first numerical embodiment of the imaging optical system. FIG. 1 shows a lens arrangement of the imaging optical system. FIGS. 2A, 2B, 2C and 2D show various aberrations that occurred in the imaging optical system of FIG. 1. Table 1 indicates the surface data, Table 2 indicates various lens system data, Table 3 indicates focal length data, Table 4 indicates aspherical surface data, and Table 5 indicates curvature data.

The imaging optical system of the first numerical embodiment is configured of a negative first lens group G1, a diaphragm (axial light-bundle restriction diaphragm/aperture diaphragm) S, and a positive second lens group G2, in that order from the object side. A cover glass CG is provided between the second lens group G2 and an imaging surface IM.

The first lens group G1 is configured of a negative lens element 11 and a negative lens element 12, in that order from the object side. An aspherical surface is formed on each side of the negative lens element 11. The object side of the negative lens element 11 includes a paraxial convex surface convexing toward the object side (the paraxial curvature has a positive value), and includes a peripheral surface having a curvature that is less than the curvature of the paraxial convex surface.

The second lens group G2 is configured of a positive lens element 21, a positive lens element 22, a negative lens element 23, a positive lens element 24 and a positive lens element 25, in that order from the object side. An aspherical surface is formed on each side of the positive lens element 22, and an aspherical surface is formed on each side of the positive lens element 25. The negative lens element 23 and the positive lens element 24 are cemented to each other. The image side of the positive lens element 25 includes a paraxial concave surface concaving toward the image side (the paraxial curvature has a positive value), and includes a peripheral surface having an inflection point that changes from a positive value of the paraxial curvature to a negative value. A second diaphragm is provided between the positive lens element 21 and the positive lens element 22, and a third diaphragm is provided between the positive lens element 24 and the positive lens element 25. The second and third diaphragms are omitted from the drawings and are only indicated in the lens data.

TABLE 1

SURFACE DATA

| Surf. No. | r | d | N(d) | vd | Effective Aperture |
|---|---|---|---|---|---|
| 1* | 7.410 | 2.035 | 1.77377 | 47.2 | 4.95 |
| 2* | 2.977 | 2.578 | | | 2.93 |
| 3 | −5.951 | 2.692 | 1.94595 | 18.0 | 2.66 |
| 4 | −8.304 | −0.147 | | | 2.73 |
| 5(Diaphragm) | ∞ | 0.924 | | | 2.64 |
| 6 | −171.308 | 3.213 | 1.95375 | 32.3 | 2.85 |
| 7 | −16.528 | 2.040 | | | 3.21 |
| 8(Diaphragm) | ∞ | 0.000 | | | 3.35 |
| 9* | 9.513 | 4.003 | 1.49710 | 81.6 | 3.65 |
| 10* | −9.384 | 0.421 | | | 3.89 |
| 11 | −2181.880 | 0.632 | 1.84666 | 23.8 | 3.93 |
| 12 | 8.197 | 3.420 | 1.49710 | 81.6 | 3.99 |
| 13 | −13.609 | 0.696 | | | 4.30 |
| 14(Diaphragm) | ∞ | 0.696 | | | 4.47 |
| 15* | 9.497 | 2.518 | 1.55332 | 71.7 | 4.69 |
| 16* | 15.535 | 3.987 | | | 4.55 |
| 17 | ∞ | 0.400 | 1.51680 | 64.2 | 4.16 |
| 18 | ∞ | 0.045 | | | 4.14 |
| IM(Imaging Surface) | | | | | |

The asterisk (*) designates an aspherical surface which is rotationally symmetrical with respect to the optical axis.

TABLE 2

VARIOUS LENS SYSTEM DATA

| | |
|---|---|
| f | 5.084 |
| FNO. | 1.60 |
| W | 60.0 |
| Y | 4.032 |

TABLE 3

FOCAL LENGTH DATA

| | |
|---|---|
| Focal length of first lens group G1: | −7.765 |
| Focal length of second lens group G2: | 7.656 |
| Focal length of negative lens element 11: | −8.041 |
| Focal length of negative lens element 12: | −50.019 |
| Focal length of positive lens element 21: | 18.988 |
| Focal length of positive lens element 22: | 10.222 |
| Focal length of negative lens element 23: | −9.645 |
| Focal length of positive lens element 24: | 10.857 |
| Focal length of positive lens element 25: | 38.452 |

TABLE 4

ASPHERICAL SURFACE DATA

| Surf. No. | K | A4 | A6 |
|---|---|---|---|
| 1 | −0.0806 | −2.06833E−03 | −4.36869E−06 |
| 2 | −1.0194 | −1.16774E−03 | 6.15473E−05 |
| 9 | 0.0000 | −1.81955E−04 | 1.60216E−05 |
| 10 | 0.0000 | 4.88626E−04 | 1.68242E−05 |
| 15 | 0.0000 | −7.90661E−04 | 2.45188E−05 |
| 16 | 0.0000 | −1.78618E−03 | 4.00672E−05 |

| Surf. No. | A8 | A10 | A12 |
|---|---|---|---|
| 1 | 2.17249E−06 | −6.56251E−08 | 6.41029E−10 |
| 2 | 1.41572E−05 | −1.38215E−06 | 1.49751E−07 |
| 9 | −6.77504E−07 | 4.61939E−08 | −7.68142E−10 |
| 10 | −3.15690E−07 | 2.11008E−08 | 1.83136E−10 |
| 15 | −1.29056E−06 | 4.19311E−08 | −1.79442E−10 |
| 16 | −7.98307E−07 | 6.76882E−09 | 7.25306E−10 |

TABLE 5

CURVATURE DATA

| Height H[mm] from Optical Axis | Radius of Curvature Ry[mm] | Curvature 1/Ry[mm] |
|---|---|---|
| Surface on object side of negative lens element 11 | | |
| 4.950 | 55.652 | 0.018 |
| 4.703 | 137.269 | 0.007 |
| 4.455 | −674.133 | −0.001 |
| 4.208 | −109.585 | −0.009 |
| 3.960 | −66.692 | 0.015 |
| 3.713 | −55.328 | −0.018 |
| 3.465 | −56.925 | −0.018 |
| 3.218 | −76.108 | −0.013 |
| 2.970 | −202.590 | −0.005 |
| 2.723 | 153.344 | 0.007 |
| 2.475 | 48.826 | 0.020 |
| 2.228 | 27.707 | 0.036 |
| 1.980 | 19.048 | 0.053 |
| 1.733 | 14.513 | 0.069 |
| 1.485 | 11.824 | 0.085 |
| 1.238 | 10.112 | 0.099 |
| 0.990 | 8.984 | 0.111 |
| 0.743 | 8.236 | 0.121 |
| 0.495 | 7.760 | 0.129 |
| 0.248 | 7.495 | 0.133 |
| 0.000 | 7.410 | 0.135 |
| Maximum Curvature: | | 0.135 |
| Minimum Curvature: | | −0.018 |
| Apv | | 0.153 |
| Image-side Surface of Positive Lens Element 25 | | |
| 4.550 | 4.474 | 0.224 |
| 4.323 | 10.824 | 0.092 |
| 4.095 | 68.464 | 0.015 |
| 3.868 | −35.397 | −0.028 |
| 3.640 | −20.403 | −0.049 |
| 3.413 | −17.827 | −0.056 |
| 3.185 | −18.223 | −0.055 |
| 2.958 | −20.524 | −0.049 |
| 2.730 | −25.193 | −0.040 |
| 2.503 | −34.449 | −0.029 |
| 2.275 | −57.178 | −0.017 |
| 2.048 | −179.338 | −0.006 |
| 1.941 | ∞(Inflection Point) | 0.000 |
| 1.820 | 157.835 | 0.006 |
| 1.593 | 55.804 | 0.018 |
| 1.365 | 34.649 | 0.029 |
| 1.138 | 25.746 | 0.039 |
| 0.910 | 21.031 | 0.048 |
| 0.682 | 18.286 | 0.055 |
| 0.455 | 16.669 | 0.060 |
| 0.227 | 15.807 | 0.063 |
| 0.000 | 15.535 | 0.064 |
| Maximum Curvature: | | 0.224 |
| Minimum Curvature: | | −0.056 |
| Bpv | | 0.280 |

Numerical Embodiment 2

Figure 3:
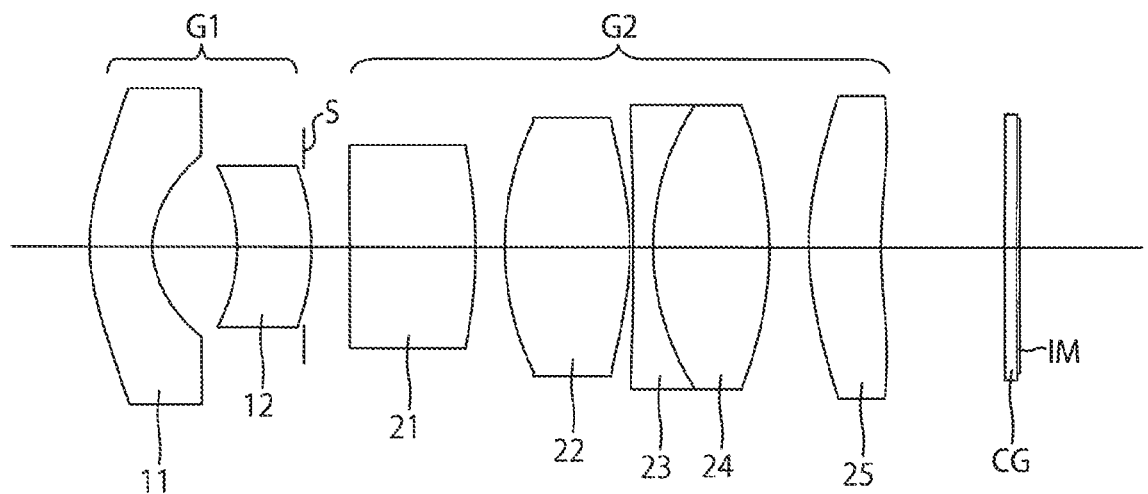
FIG. 3 shows a lens arrangement of a second numerical embodiment of the imaging optical system.
Figures 4A, 4B, 4C, 4D:
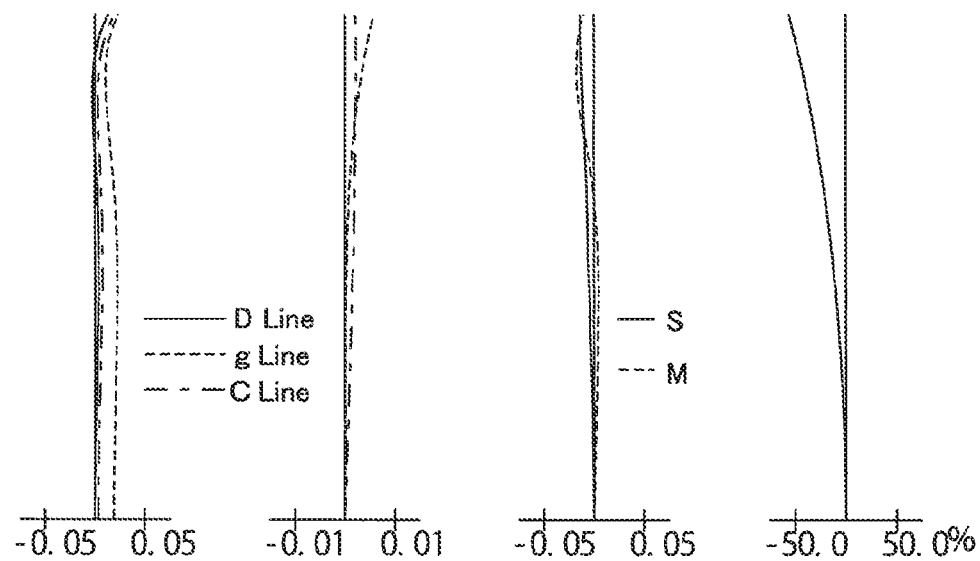
FIGS. 4A, 4B, 4C and 4D show various aberrations that occurred in the lens arrangement of FIG. 3.

FIGS. 3 through 4D and Tables 6 through 10 show a second numerical embodiment of the imaging optical system. FIG. 3 shows a lens arrangement of the imaging optical system. FIGS. 4A, 4B, 4C and 4D show various aberrations that occurred in the imaging optical system of FIG. 3. Table 6 indicates the surface data, Table 7 indicates various lens system data, Table 8 indicates focal length data, Table 9 indicates aspherical surface data, and Table 10 indicates curvature data.

The lens arrangement of the second numerical embodiment is the same as that of the first numerical embodiment.

TABLE 6

SURFACE DATA

| Surf. No. | r | d | N(d) | vd | Effective Aperture |
|---|---|---|---|---|---|
| 1* | 6.257 | 1.994 | 1.77377 | 47.2 | 4.95 |
| 2* | 2.732 | 2.689 | | | 2.85 |
| 3 | −5.319 | 2.345 | 1.95375 | 32.3 | 2.49 |
| 4 | −7.257 | −0.246 | | | 2.54 |
| 5(Diaphragm) | ∞ | 1.455 | | | 2.46 |
| 6 | 1209.481 | 4.003 | 1.90366 | 31.3 | 2.78 |
| 7 | −15.648 | 0.105 | | | 3.19 |
| 8(Diaphragm) | ∞ | 0.828 | | | 3.20 |
| 9* | 8.942 | 4.003 | 1.49710 | 81.6 | 3.90 |
| 10* | −10.203 | 0.105 | | | 4.05 |
| 11 | −101.914 | 0.632 | 1.84666 | 23.8 | 4.07 |
| 12 | 8.111 | 3.698 | 1.49710 | 81.6 | 4.13 |
| 13 | −11.646 | −0.673 | | | 4.45 |
| 14(Diaphragm) | ∞ | 1.919 | | | 4.47 |
| 15* | 9.081 | 2.267 | 1.55332 | 71.7 | 4.75 |
| 16* | 14.492 | 3.907 | | | 4.67 |
| 17 | ∞ | 0.400 | 1.51680 | 64.2 | 4.17 |
| 18 | ∞ | 0.045 | | | 4.14 |
| IM(Imaging Surface) | | | | | |

The asterisk (*) designates an aspherical surface which is rotationally symmetrical with respect to the optical axis.

TABLE 7

VARIOUS LENS SYSTEM DATA

| | |
|---|---|
| f | 4.958 |
| FNO. | 1.60 |
| W | 60.0 |
| Y | 4.032 |

TABLE 8

FOCAL LENGTH DATA

| | |
|---|---|
| Focal length of first lens group G1: | −8.036 |
| Focal length of second lens group G2: | 7.348 |
| Focal length of negative lens element 11: | −8.319 |
| Focal length of negative lens element 12: | −51.038 |
| Focal length of positive lens element 21: | 17.122 |
| Focal length of positive lens element 22: | 10.302 |
| Focal length of negative lens element 23: | −8.850 |
| Focal length of positive lens element 24: | 10.255 |
| Focal length of positive lens element 25: | 38.248 |

TABLE 9

ASPHERICAL SURFACE DATA

| Surf. No. | K | A4 | A6 |
|---|---|---|---|
| 1 | −0.1975 | −1.95794E−03 | −2.59403E−05 |
| 2 | −0.6714 | −2.68881E−03 | −6.99740E−05 |
| 9 | 0.0000 | −1.19557E−04 | 6.14423E−06 |
| 10 | 0.0000 | 5.07460E−04 | 1.65691E−05 |
| 15 | 0.0000 | −1.06898E−03 | 2.44815E−05 |
| 16 | 0.0000 | −2.02213E−03 | 4.43963E−05 |

| Surf. No. | A8 | A10 | A12 |
|---|---|---|---|
| 1 | 2.86594E−06 | −7.64117E−08 | 6.77581E−10 |
| 2 | 3.64073E−05 | −4.75724E−06 | 3.99783E−07 |
| 9 | 7.61944E−07 | −3.46679E−08 | 7.48091E−10 |
| 10 | 2.89317E−07 | −8.17899E−09 | 5.10570E−10 |
| 15 | −1.50059E−06 | 5.78279E−08 | −7.12154E−10 |
| 16 | −1.63109E−06 | 6.26059E−08 | −7.86905E−10 |

TABLE 10

CURVATURE DATA

| Height H[mm] from Optical Axis | Radius of Curvature Ry[mm] | Curvature 1/Ry[mm] |
|---|---|---|
| Surface on object side of negative lens element 11 | | |
| 4.950 | 14.372 | 0.070 |
| 4.703 | 20.105 | 0.050 |
| 4.455 | 29.374 | 0.034 |
| 4.208 | 46.837 | 0.021 |
| 3.960 | 83.200 | 0.012 |
| 3.713 | 147.570 | 0.007 |
| 3.465 | 163.540 | 0.006 |
| 3.218 | 99.289 | 0.010 |
| 2.970 | 54.809 | 0.018 |
| 2.723 | 33.423 | 0.030 |
| 2.475 | 22.619 | 0.044 |
| 2.228 | 16.616 | 0.060 |
| 1.980 | 12.999 | 0.077 |
| 1.733 | 10.682 | 0.094 |
| 1.485 | 9.133 | 0.109 |
| 1.238 | 8.069 | 0.124 |
| 0.990 | 7.332 | 0.136 |
| 0.743 | 6.828 | 0.146 |
| 0.495 | 6.501 | 0.154 |
| 0.248 | 6.316 | 0.158 |
| 0.000 | 6.257 | 0.160 |
| Maximum Curvature: | 0.160 | |
| Minimum Curvature: | 0.006 | |
| Apv | 0.154 | |
| Image-side Surface of Positive Lens Element 25 | | |
| 4.670 | 3063.772 | 0.000 |
| 4.437 | −25.639 | −0.039 |
| 4.203 | −14.831 | −0.067 |
| 3.970 | −11.799 | −0.085 |
| 3.736 | −10.847 | −0.092 |
| 3.503 | −10.917 | −0.092 |
| 3.269 | −11.764 | −0.085 |
| 3.036 | −13.461 | −0.074 |
| 2.802 | −16.396 | −0.061 |
| 2.569 | −21.607 | −0.046 |
| 2.335 | −32.264 | −0.031 |
| 2.102 | −63.708 | −0.016 |
| 1.868 | −1267.067 | −0.001 |
| 1.855 | ∞(Inflection Point) | 0.000 |
| 1.635 | 74.532 | 0.013 |
| 1.401 | 37.537 | 0.027 |
| 1.168 | 25.911 | 0.039 |
| 0.934 | 20.419 | 0.049 |
| 0.701 | 17.401 | 0.057 |
| 0.467 | 15.678 | 0.064 |
| 0.234 | 14.775 | 0.068 |
| 0.000 | 14.492 | 0.069 |
| Maximum Curvature: | 0.069 | |
| Minimum Curvature: | −0.092 | |
| Bpv | 0.161 | |

Numerical Embodiment 3

Figure 5:
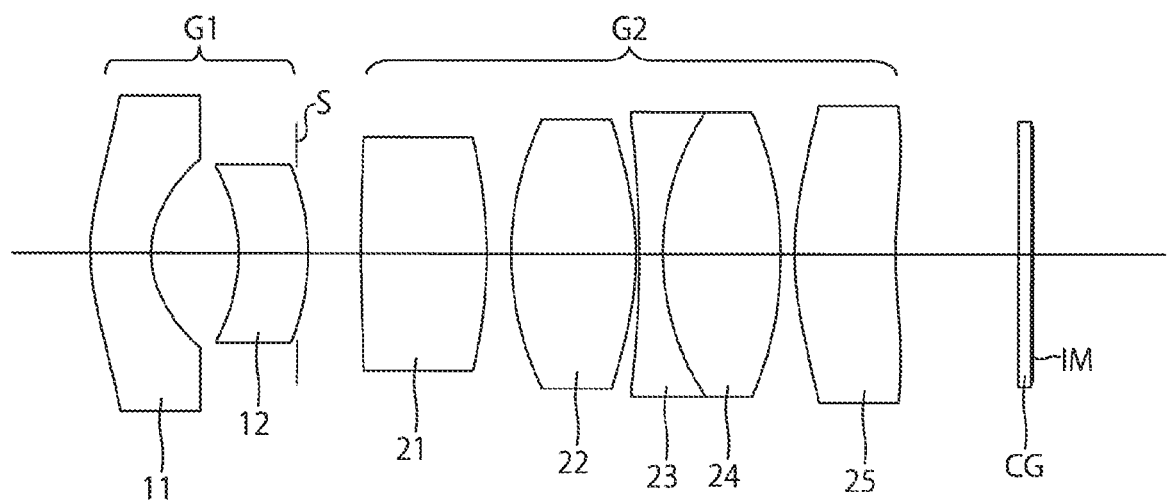
FIG. 5 shows a lens arrangement of a third numerical embodiment of the imaging optical system.
Figures 6A, 6B, 6C, 6D:
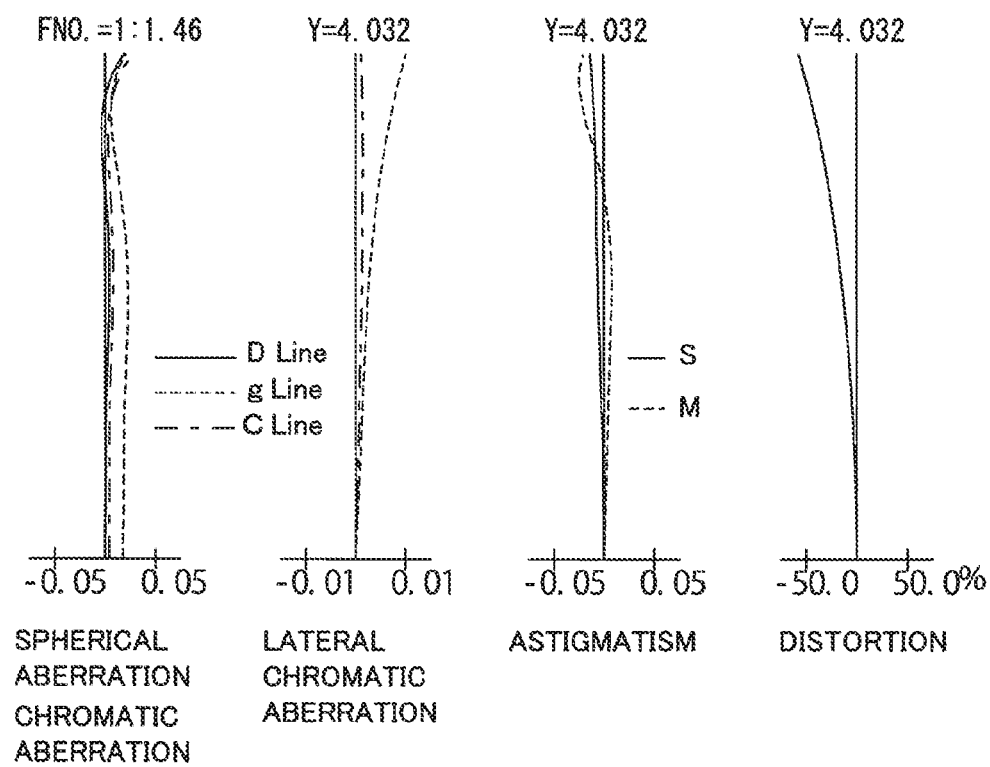
FIGS. 6A, 6B, 6C and 6D show various aberrations that occurred in the lens arrangement of FIG. 5.

FIGS. 5 through 6D and Tables 11 through 15 show a third numerical embodiment of the imaging optical system. FIG. 5 shows a lens arrangement of the imaging optical system. FIGS. 6A, 6B, 6C and 6D show various aberrations that occurred in the imaging optical system of FIG. 5. Table 11 indicates the surface data, Table 12 indicates various lens system data, Table 13 indicates focal length data, Table 14 indicates aspherical surface data, and Table 15 indicates curvature data.

The lens arrangement of the third numerical embodiment is the same as that of the first numerical embodiment.

TABLE 11

SURFACE DATA

| Surf. No. | r | d | N(d) | vd | Effective Aperture |
|---|---|---|---|---|---|
| 1* | 6.838 | 1.912 | 1.77377 | 47.2 | 4.95 |
| 2* | 2.840 | 2.778 | | | 2.98 |
| 3 | −5.571 | 2.187 | 1.90366 | 31.3 | 2.70 |
| 4 | −7.308 | −0.351 | | | 2.81 |
| 5(Diaphragm) | ∞ | 2.030 | | | 2.74 |
| 6 | 91.273 | 4.003 | 1.90366 | 31.3 | 3.28 |
| 7 | −14.914 | 0.190 | | | 3.67 |
| 8(Diaphragm) | ∞ | 0.589 | | | 3.66 |
| 9* | 9.249 | 4.003 | 1.49710 | 81.6 | 4.17 |
| 10* | −9.980 | 0.105 | | | 4.22 |
| 11 | −35.039 | 0.745 | 1.84666 | 23.8 | 4.16 |
| 12 | 7.991 | 3.758 | 1.49710 | 81.6 | 4.16 |
| 13 | −11.483 | −0.696 | | | 4.47 |
| 14(Diaphragm) | ∞ | 1.122 | | | 4.49 |
| 15* | 10.060 | 3.166 | 1.55332 | 71.7 | 4.66 |
| 16* | 16.231 | 3.866 | | | 4.56 |
| 17 | ∞ | 0.400 | 1.51680 | 64.2 | 4.17 |
| 18 | ∞ | 0.045 | | | 4.14 |
| IM(Imaging Surface) | | | | | |

The asterisk (*) designates an aspherical surface which is rotationally symmetrical with respect to the optical axis.

TABLE 12

VARIOUS LENS SYSTEM DATA

| | |
|---|---|
| f | 5.002 |
| FNO. | 1.46 |
| W | 60.0 |
| Y | 4.032 |

TABLE 13

FOCAL LENGTH DATA

| | |
|---|---|
| Focal length of first lens group G1: | −7.862 |
| Focal length of second lens group G2: | 7.345 |
| Focal length of negative lens element 11: | −7.933 |
| Focal length of negative lens element 12: | −64.501 |
| Focal length of positive lens element 21: | 14.444 |
| Focal length of positive lens element 22: | 10.374 |
| Focal length of negative lens element 23 | −7.625 |
| Focal length of positive lens element 24: | 10.127 |
| Focal length of positive lens element 25: | 40.425 |

TABLE 14

ASPHERICAL SURFACE DATA

| Surf. No. | K | A4 | A6 |
|---|---|---|---|
| 1 | −0.0180 | −2.41654E−03 | −4.19297E−06 |
| 2 | −0.6817 | −3.41489E−03 | 3.30237E−05 |
| 9 | 0.0000 | −1.50411E−04 | −6.08936E−06 |
| 10 | 0.0000 | 2.41967E−04 | 1.34168E−05 |
| 15 | 0.0000 | −1.03359E−03 | 1.83630E−05 |
| 16 | 0.0000 | −1.91771E−03 | 3.87362E−05 |

| Surf. No. | A8 | A10 | A12 |
|---|---|---|---|
| 1 | 2.47966E−06 | −8.14826E−08 | 8.41214E−10 |
| 2 | 1.46356E−05 | −1.69091E−06 | 1.50548E−07 |
| 9 | 1.26111E−06 | −6.35974E−08 | 1.35085E−09 |
| 10 | 3.97623E−07 | −3.37226E−08 | 9.32530E−10 |
| 15 | −9.59413E−07 | 3.60112E−08 | −3.09546E−10 |
| 16 | −1.14759E−06 | 3.88443E−08 | −2.75049E−10 |

TABLE 15

CURVATURE DATA

| Height H[mm] from Optical Axis | Radius of Curvature Ry[mm] | Curvature 1/Ry[mm] |
|---|---|---|
| Surface on object side of negative lens element 11 | | |
| 4.950 | 40.834 | 0.024 |
| 4.703 | 199.321 | 0.005 |
| 4.455 | −151.111 | −0.007 |
| 4.208 | −67.559 | −0.015 |
| 3.960 | −48.737 | −0.021 |
| 3.713 | −42.843 | −0.023 |
| 3.465 | −44.300 | −0.023 |
| 3.218 | −56.186 | −0.018 |
| 2.970 | −110.470 | −0.009 |
| 2.723 | 311.140 | 0.003 |
| 2.475 | 54.735 | 0.018 |
| 2.228 | 28.372 | 0.035 |
| 1.980 | 18.783 | 0.053 |
| 1.733 | 14.009 | 0.071 |
| 1.485 | 11.252 | 0.089 |
| 1.238 | 9.525 | 0.105 |
| 0.990 | 8.397 | 0.119 |
| 0.743 | 7.655 | 0.131 |
| 0.495 | 7.184 | 0.139 |
| 0.248 | 6.923 | 0.144 |
| 0.000 | 6.838 | 0.146 |
| Maximum Curvature: | | 0.146 |
| Minimum Curvature: | | −0.023 |
| Apv | | 0.170 |
| Image-side Surface of Positive Lens Element 25 | | |
| 4.560 | 35.693 | 0.028 |
| 4.332 | −34.325 | −0.029 |
| 4.104 | −15.532 | −0.064 |
| 3.876 | −11.985 | −0.083 |
| 3.648 | −11.027 | −0.091 |
| 3.420 | −11.165 | −0.090 |
| 3.192 | −12.086 | −0.083 |
| 2.964 | −13.845 | −0.072 |
| 2.736 | −16.810 | −0.059 |
| 2.508 | −21.946 | −0.046 |
| 2.280 | −32.079 | −0.031 |
| 2.052 | −59.500 | −0.017 |
| 1.824 | −352.673 | −0.003 |
| 1.776 | ∞(Inflection Point) | 0.000 |
| 1.596 | 95.775 | 0.010 |
| 1.368 | 43.960 | 0.023 |
| 1.140 | 29.574 | 0.034 |
| 0.912 | 23.061 | 0.043 |
| 0.684 | 19.556 | 0.051 |
| 0.456 | 17.580 | 0.057 |
| 0.228 | 16.552 | 0.060 |
| 0.000 | 16.231 | 0.062 |
| Maximum Curvature: | | 0.062 |
| Minimum Curvature: | | −0.091 |
| Bpv | | 0.152 |

Numerical Embodiment 4

Figure 7:
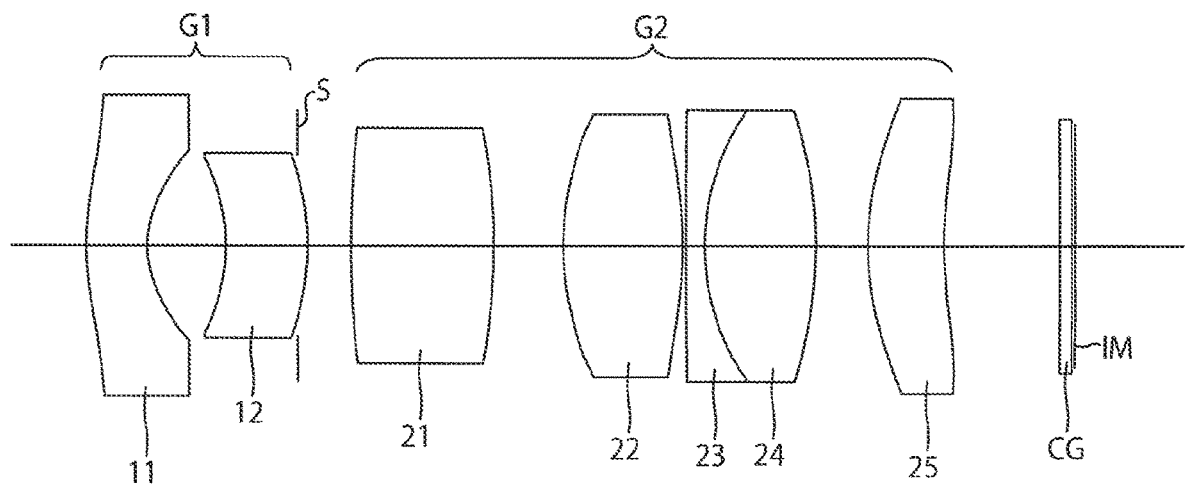
FIG. 7 shows a lens arrangement of a fourth numerical embodiment of the imaging optical system.
Figures 8A, 8B, 8C, 8D:
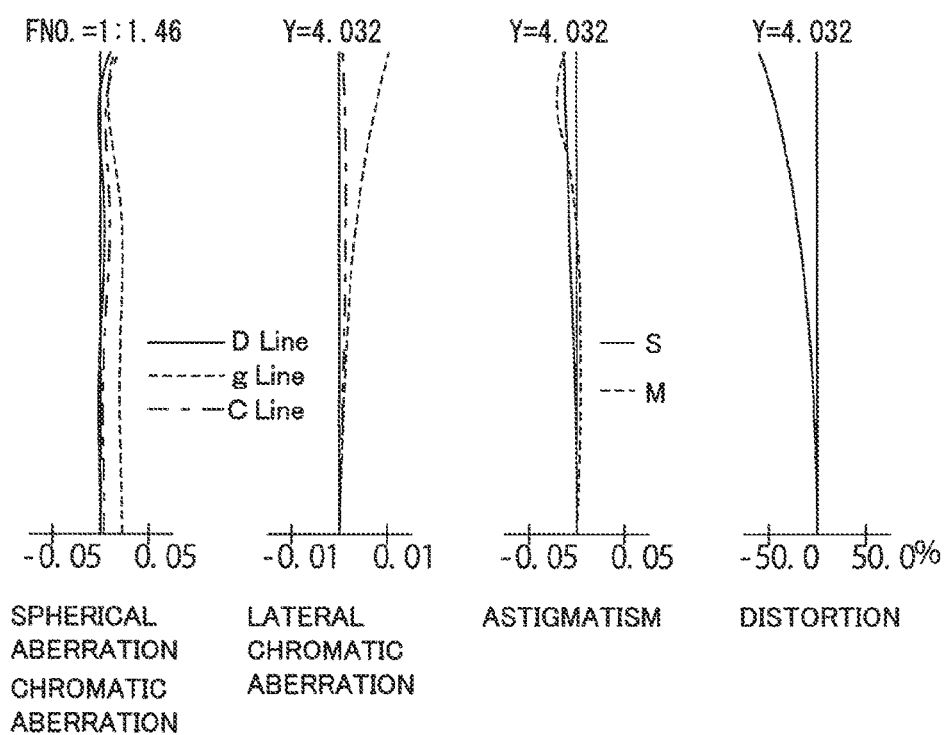
FIGS. 8A, 8B, 8C and 8D show various aberrations that occurred in the lens arrangement of FIG. 7.

FIGS. 7 through 8D and Tables 16 through 20 show a fourth numerical embodiment of the imaging optical system. FIG. 7 shows a lens arrangement of the imaging optical system. FIGS. 8A, 8B, 8C and 8D show various aberrations that occurred in the imaging optical system of FIG. 7. Table 16 indicates the surface data, Table 17 indicates various lens system data, Table 18 indicates focal length data, Table 19 indicates aspherical surface data, and Table 20 indicates curvature data.

The lens arrangement of the fourth numerical embodiment is the same as that of the first numerical embodiment.

TABLE 16

SURFACE DATA

| Surf. No. | r | d | N(d) | vd | Effective Aperture |
|---|---|---|---|---|---|
| 1* | 8.891 | 2.028 | 1.80139 | 45.5 | 4.95 |
| 2* | 3.308 | 2.593 | | | 3.12 |
| 3 | −6.264 | 2.731 | 1.95375 | 32.3 | 2.87 |
| 4 | −8.835 | −0.325 | | | 3.03 |
| 5(Diaphragm) | ∞ | 1.761 | | | 2.98 |
| 6 | 33.601 | 4.741 | 1.91082 | 35.3 | 3.51 |
| 7 | −20.878 | 1.988 | | | 3.87 |
| 8(Diaphragm) | ∞ | 0.335 | | | 3.86 |
| 9* | 9.588 | 4.003 | 1.49710 | 81.6 | 4.28 |
| 10* | −13.990 | 0.105 | | | 4.32 |
| 11 | 262.809 | 0.632 | 1.84666 | 23.8 | 4.30 |
| 12 | 7.735 | 3.674 | 1.49710 | 81.6 | 4.26 |
| 13 | −14.486 | −0.500 | | | 4.48 |
| 14(Diaphragm) | ∞ | 2.220 | | | 4.49 |
| 15* | 9.173 | 2.519 | 1.58313 | 59.5 | 4.88 |
| 16* | 13.045 | 3.813 | | | 4.76 |
| 17 | ∞ | 0.400 | 1.51680 | 64.2 | 4.18 |
| 18 | ∞ | 0.045 | | | 4.14 |
| IM(Imaging Surface) | | | | | |

The asterisk (*) designates an aspherical surface which is rotationally symmetrical with respect to the optical axis.

TABLE 17

VARIOUS LENS SYSTEM DATA

| | |
|---|---|
| f | 5.218 |
| FNO. | 1.46 |
| W | 60.0 |
| Y | 4.032 |

TABLE 18

FOCAL LENGTH DATA

| | |
|---|---|
| Focal length of first lens group G1: | −7.435 |
| Focal length of second lens group G2: | 8.301 |
| Focal length of negative lens element 11: | −7.842 |
| Focal length of negative lens element 12: | −46.875 |
| Focal length of positive lens element 21: | 14.750 |
| Focal length of positive lens element 22: | 12.128 |
| Focal length of negative lens element 23: | −9.424 |
| Focal length of positive lens element 24: | 10.733 |
| Focal length of positive lens element 25: | 42.751 |

TABLE 19

ASPHERICAL SURFACE DATA

| Surf. No. | K | A4 | A6 |
|---|---|---|---|
| 1 | 0.0805 | −2.17353E−03 | 8.66240E−06 |
| 2 | −0.8692 | −2.44249E−03 | −1.25315E−05 |
| 9 | 0.0000 | −5.81662E−05 | −8.54969E−06 |
| 10 | 0.0000 | 4.27312E−04 | −3.19596E−06 |
| 15 | 0.0000 | −4.99928E−04 | −1.83522E−06 |
| 16 | 0.0000 | −1.33728E−03 | 1.02292E−05 |

| Surf. No. | A8 | A10 | A12 |
|---|---|---|---|
| 1 | 2.08794E−06 | −8.08410E−08 | 1.01806E−09 |
| 2 | 2.02207E−05 | −1.61188E−06 | 6.86824E−08 |
| 9 | 1.38246E−06 | −6.21286E−08 | 1.20294E−09 |
| 10 | 1.00664E−06 | −4.35215E−08 | 9.66803E−10 |
| 15 | 1.49723E−07 | −7.02030E−09 | 1.28914E−10 |
| 16 | −5.11577E−07 | 2.26827E−08 | −3.03228E−10 |

TABLE 20

CURVATURE DATA

| Height H[mm] from Optical Axis | Radius of Curvature Ry[mm] | Curvature 1/Ry[mm] |
|---|---|---|
| Surface on object side of negative lens element 11 | | |
| 4.950 | 116.571 | 0.009 |
| 4.703 | −47.018 | −0.021 |
| 4.455 | −28.620 | −0.035 |
| 4.208 | −24.176 | −0.041 |
| 3.960 | −22.583 | −0.044 |
| 3.713 | −22.368 | −0.045 |
| 3.465 | −23.525 | −0.043 |
| 3.218 | −26.803 | −0.037 |
| 2.970 | −34.542 | −0.029 |
| 2.723 | −56.752 | −0.018 |
| 2.475 | −261.345 | −0.004 |
| 2.228 | 85.353 | 0.012 |
| 1.980 | 35.467 | 0.028 |
| 1.733 | 22.325 | 0.045 |
| 1.485 | 16.461 | 0.061 |
| 1.238 | 13.265 | 0.075 |
| 0.990 | 11.346 | 0.088 |
| 0.743 | 10.150 | 0.099 |
| 0.495 | 9.417 | 0.106 |
| 0.248 | 9.018 | 0.111 |
| 0.000 | 8.891 | 0.112 |
| Maximum Curvature: | | 0.112 |
| Minimum Curvature: | | −0.045 |
| Apv | | 0.157 |
| Image-side Surface of Positive Lens Element 25 | | |
| 4.760 | −6.949 | −0.144 |
| 4.522 | −7.267 | −0.138 |
| 4.284 | −7.754 | −0.129 |
| 4.046 | −8.523 | −0.117 |
| 3.808 | −9.704 | −0.103 |
| 3.570 | −11.507 | −0.087 |
| 3.332 | −14.338 | −0.070 |
| 3.094 | −19.102 | −0.052 |
| 2.856 | −28.329 | −0.035 |
| 2.618 | −52.658 | −0.019 |
| 2.380 | −272.830 | −0.004 |
| 2.320 | ∞(Inflection Point) | 0.000 |
| 2.142 | 94.875 | 0.011 |
| 1.904 | 42.461 | 0.024 |
| 1.666 | 28.316 | 0.035 |
| 1.428 | 21.844 | 0.046 |
| 1.190 | 18.223 | 0.055 |
| 0.952 | 15.995 | 0.063 |
| 0.714 | 14.575 | 0.069 |
| 0.476 | 13.690 | 0.073 |
| 0.238 | 13.201 | 0.076 |
| 0.000 | 13.045 | 0.077 |
| Maximum Curvature: | | 0.077 |
| Minimum Curvature: | | −0.144 |
| Bpv | | 0.221 |

Numerical Embodiment 5

Figures 9, 10A, 10B, 10C, 10D:
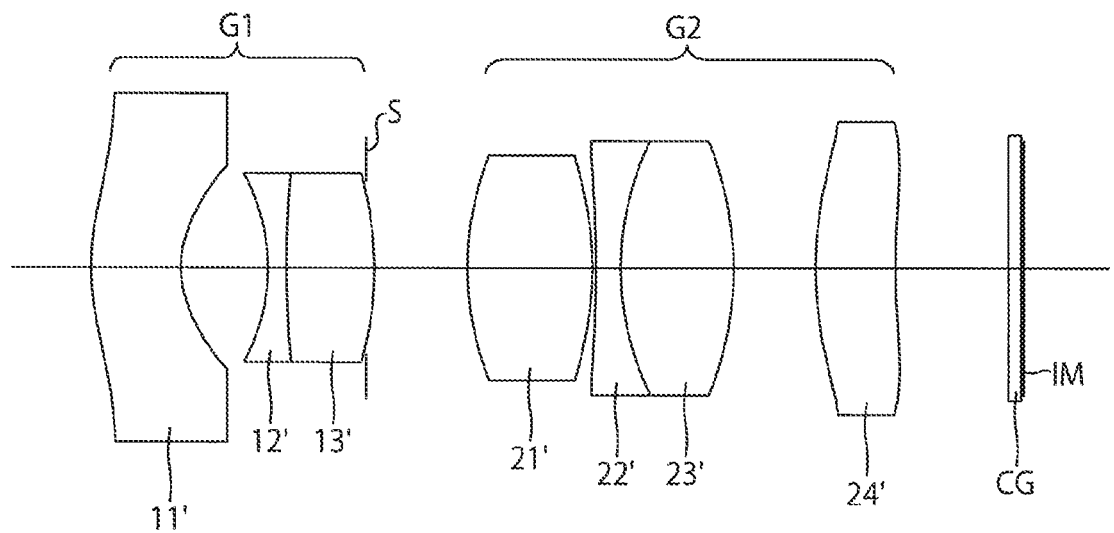
FIG. 9 shows a lens arrangement of a fifth numerical embodiment of the imaging optical system.
FIGS. 10A, 10B, 10C and 10D show various aberrations that occurred in the lens arrangement of FIG. 9.

FIGS. 9 through 10D and Tables 21 through 25 show a fifth numerical embodiment of the imaging optical system. FIG. 9 shows a lens arrangement of the imaging optical system. FIGS. 10A, 10B, 10C and 10D show various aberrations that occurred in the imaging optical system of FIG. 9. Table 21 indicates the surface data, Table 22 indicates various lens system data, Table 23 indicates focal length data, Table 24 indicates aspherical surface data, and Table 25 indicates curvature data.

The imaging optical system of the fifth numerical embodiment is configured of a negative first lens group G1, a diaphragm (axial light-bundle restriction diaphragm/aperture diaphragm) S, a second diaphragm, and a positive second lens group G2, in that order from the object side. The second diaphragm does not restrict the axial light bundle (is an abaxial light-bundle restriction diaphragm), and is omitted from the drawings, though indicated in the lens data. A cover glass CG is provided between the second lens group G2 and an imaging surface IM.

The first lens group G1 is configured of a negative lens element 11', a negative lens element 12', and a positive lens element 13', in that order from the object side. An aspherical surface is formed on each side of the negative lens element 11'. The negative lens element 12' and the positive lens element 13' are cemented to each other. The object side of the negative lens element 11' includes a paraxial convex surface convexing toward the object side (the paraxial curvature has a positive value), and includes a peripheral surface having a curvature that is less than the curvature of the paraxial convex surface.

The second lens group G2 is configured of a positive lens element 21', a negative lens element 22', a positive lens element 23', and a positive lens element 24', in that order from the object side. An aspherical surface is formed on each side of the positive lens element 21', and an aspherical surface is formed on each side of the positive lens element 24'. The negative lens element 22' and the positive lens element 23' are cemented to each other. The image side of the positive lens element 24' includes a paraxial concave surface concaving toward the image side (the paraxial curvature has a positive value), and includes a peripheral surface having an inflection point that changes from a positive value of the paraxial curvature to a negative value.

TABLE 21

SURFACE DATA

| Surf. No. | r | d | N(d) | vd | Effective Aperture |
|---|---|---|---|---|---|
| 1* | 7.890 | 2.842 | 1.77377 | 47.2 | 5.48 |
| 2* | 3.113 | 2.749 | | | 3.21 |
| 3 | −6.156 | 0.593 | 1.51742 | 52.2 | 2.96 |
| 4 | 32.437 | 2.767 | 1.95375 | 32.3 | 2.90 |
| 5 | −11.010 | −0.256 | | | 2.77 |
| 6(Diaphragm) | ∞ | 1.888 | | | 2.73 |
| 7(Diaphragm) | ∞ | 1.351 | | | 3.13 |
| 8* | 9.056 | 4.000 | 1.55332 | 71.7 | 3.54 |
| 9* | −9.419 | 0.101 | | | 3.50 |
| 10 | −45.392 | 0.800 | 1.75211 | 25.1 | 3.54 |
| 11 | 8.923 | 3.594 | 1.55032 | 75.5 | 3.68 |
| 12 | −10.431 | 2.569 | | | 4.00 |
| 13* | 11.790 | 2.500 | 1.58313 | 59.5 | 4.55 |
| 14* | 18.915 | 3.555 | | | 4.62 |
| 15 | ∞ | 0.400 | 1.51680 | 64.2 | 4.17 |
| 16 | ∞ | 0.045 | | | 4.14 |
| IM(Imaging Surface) | | | | | |

The asterisk (*) designates an aspherical surface which is rotationally symmetrical with respect to the optical axis.

TABLE 22

VARIOUS LENS SYSTEM DATA

| f | 5.800 |
|---|---|
| FNO. | 1.60 |
| W | 60.0 |
| Y | 4.032 |

TABLE 23

FOCAL LENGTH DATA

| Focal length of first lens group G1: | −7.435 |
|---|---|
| Focal length of second lens group G2: | 8.301 |

TABLE 23-continued

FOCAL LENGTH DATA

| Focal length of negative lens element 11': | −8.972 |
|---|---|
| Focal length of negative lens element 12': | −9.948 |
| Focal length of positive lens element 13': | 8.895 |
| Focal length of positive lens element 21': | 9.042 |
| Focal length of negative lens element 22': | −9.852 |
| Focal length of positive lens element 23': | 9.356 |
| Focal length of positive lens element 24': | 47.527 |

TABLE 24

ASPHERICAL SURFACE DATA

| Surf. No. | K | A4 | A6 |
|---|---|---|---|
| 1 | −5.0000 | −4.97852E−04 | −6.10143E−05 |
| 2 | −1.0000 | −2.46736E−03 | −1.05182E−04 |
| 8 | 0.0000 | −2.84607E−04 | −1.04415E−05 |
| 9 | 0.0000 | 6.48133E−04 | 3.42326E−06 |
| 13 | 0.0000 | −3.73070E−04 | 1.90051E−05 |
| 14 | 0.0000 | −1.66424E−03 | 5.52026E−05 |

| Surf. No | A8 | A10 | A12 |
|---|---|---|---|
| 1 | 3.39920E−06 | −7.00278E−08 | 5.46394E−10 |
| 2 | 2.80112E−05 | −1.81295E−06 | 6.73457E−08 |
| 8 | 3.48782E−06 | −2.76157E−07 | 8.04242E−09 |
| 9 | 8.13266E−07 | −7.77350E−08 | 2.74876E−09 |
| 13 | −2.02388E−06 | 6.90464E−08 | −1.38689E−09 |
| 14 | −3.24733E−06 | 9.04127E−08 | −1.21105E−09 |

TABLE 25

CURVATURE DATA

| Height H[mm] from Optical Axis | Radius of Curvature Ry[mm] | Curvature 1/Ry[mm] |
|---|---|---|
| Surface on object side of negative lens element 11' | | |
| 5.480 | −72.524 | −0.014 |
| 5.206 | −28.938 | −0.035 |
| 4.932 | −20.176 | −0.050 |
| 4.658 | −16.160 | −0.062 |
| 4.384 | −14.076 | −0.071 |
| 4.110 | −13.244 | −0.076 |
| 3.836 | −13.504 | −0.074 |
| 3.562 | −15.072 | −0.066 |
| 3.288 | −18.872 | −0.053 |
| 3.014 | −28.396 | −0.035 |
| 2.740 | −68.750 | −0.015 |
| 2.466 | 132.986 | 0.008 |
| 2.192 | 33.713 | 0.030 |
| 1.918 | 19.680 | 0.051 |
| 1.644 | 14.253 | 0.070 |
| 1.370 | 11.480 | 0.087 |
| 1.096 | 9.876 | 0.101 |
| 0.822 | 8.898 | 0.112 |
| 0.548 | 8.309 | 0.120 |
| 0.274 | 7.991 | 0.125 |
| 0.000 | 7.890 | 0.127 |
| Maximum Curvature: | | 0.127 |
| Minimum Curvature: | | −0.076 |
| Apv | | 0.202 |
| Image-side Surface of Positive Lens Element 24' | | |
| 4.620 | −2.847 | −0.351 |
| 4.389 | −3.401 | −0.294 |
| 4.158 | −4.100 | −0.244 |
| 3.927 | −4.988 | −0.200 |
| 3.696 | −6.134 | −0.163 |
| 3.465 | −7.647 | −0.131 |
| 3.234 | −9.696 | −0.103 |

TABLE 25-continued

CURVATURE DATA

| Height H[mm] from Optical Axis | Radius of Curvature Ry[mm] | Curvature 1/Ry[mm] |
|---|---|---|
| 3.003 | −12.574 | −0.080 |
| 2.772 | −16.845 | −0.059 |
| 2.541 | −23.790 | −0.042 |
| 2.310 | −37.118 | −0.027 |
| 2.079 | −73.783 | −0.014 |
| 1.848 | −686.182 | −0.001 |
| 1.819 | ∞(Inflection Point) | 0.000 |
| 1.617 | 104.026 | 0.010 |
| 1.386 | 50.599 | 0.020 |
| 1.155 | 34.545 | 0.029 |
| 0.924 | 27.029 | 0.037 |
| 0.693 | 22.901 | 0.044 |
| 0.462 | 20.541 | 0.049 |
| 0.231 | 19.303 | 0.052 |
| 0.000 | 18.915 | 0.053 |
| Maximum Curvature: | | 0.053 |
| Minimum Curvature: | | −0.351 |
| Bpv | | 0.404 |

Numerical Embodiment 6

Figures 11, 12A, 12B, 12C, 12D:
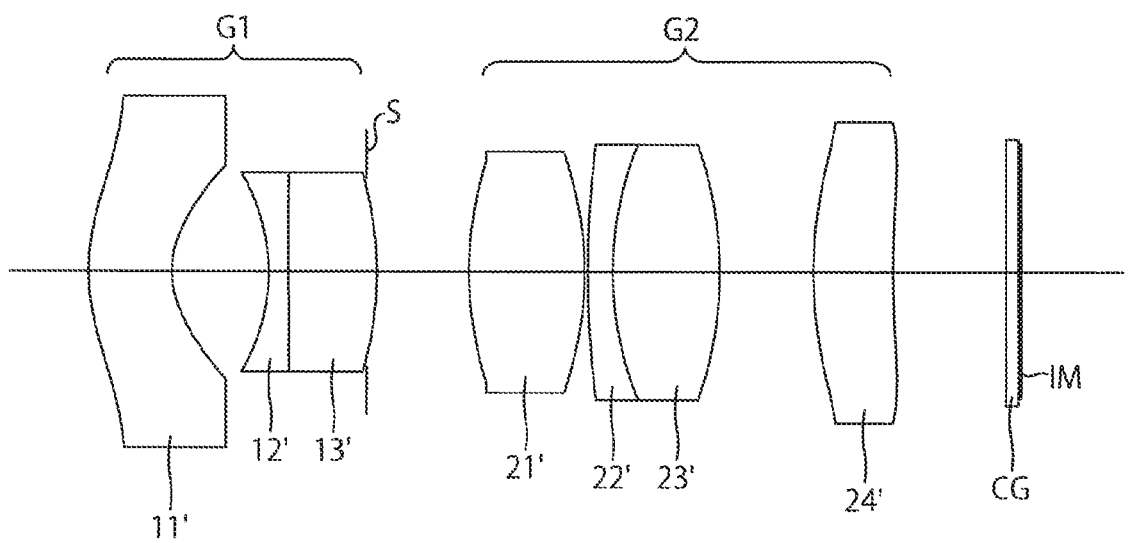
FIG. 11 shows a lens arrangement of a sixth numerical embodiment of the imaging optical system.
FIGS. 12A, 12B, 12C and 12D show various aberrations that occurred in the lens arrangement of FIG. 11.

FIGS. 11 through 12D and Tables 26 through 30 show a sixth numerical embodiment of the imaging optical system. FIG. 11 shows a lens arrangement of the imaging optical system. FIGS. 12A, 12B, 12C and 12D show various aberrations that occurred in the imaging optical system of FIG. 11. Table 26 indicates the surface data, Table 27 indicates various lens system data, Table 28 indicates focal length data, Table 29 indicates aspherical surface data, and Table 30 indicates curvature data.

The lens arrangement of the sixth numerical embodiment is the same as that of the fifth numerical embodiment except for the second diaphragm being an axial light-bundle restriction diaphragm. In other words, two axial light-bundle restriction diaphragms are provided between the first lens group G1 and the second lens group G2.

TABLE 26

SURFACE DATA

| Surf. No. | r | d | N(d) | vd | Effective Aperture |
|---|---|---|---|---|---|
| 1* | 6.347 | 2.641 | 1.83400 | 37.3 | 5.50 |
| 2* | 2.856 | 3.065 | | | 3.35 |
| 3 | −6.099 | 0.623 | 1.51680 | 64.2 | 3.12 |
| 4 | 271.233 | 2.800 | 2.05090 | 26.9 | 3.07 |
| 5 | −10.807 | −0.327 | | | 3.01 |
| 6(Diaphragm) | ∞ | 3.702 | | | 2.97 |
| 7(Diaphragm) | ∞ | −0.450 | | | 3.43 |
| 8* | 10.360 | 3.696 | 1.49710 | 81.6 | 3.47 |
| 9* | −10.409 | 0.100 | | | 3.79 |
| 10 | 30.509 | 0.800 | 1.98613 | 16.5 | 3.83 |
| 11 | 10.406 | 3.405 | 1.49710 | 81.6 | 3.78 |
| 12 | −11.970 | 2.945 | | | 4.00 |
| 13* | 13.099 | 2.500 | 1.80610 | 40.7 | 4.69 |
| 14* | 26.164 | 3.555 | | | 4.73 |
| 15 | ∞ | 0.400 | 1.51680 | 64.2 | 4.18 |
| 16 | ∞ | 0.045 | | | 4.14 |
| IM(Imaging Surface) | | | | | |

The asterisk (*) designates an aspherical surface which is rotationally symmetrical with respect to the optical axis.

TABLE 27

VARIOUS LENS SYSTEM DATA

| f | 5.800 |
|---|---|
| FNO. | 1.46 |
| W | 60.0 |
| Y | 4.032 |

TABLE 28

FOCAL LENGTH DATA

| Focal length of first lens group G1: | −18.413 |
|---|---|
| Focal length of second lens group G2: | 8.208 |
| Focal length of negative lens element 11': | −9.495 |
| Focal length of negative lens element 12': | −11.532 |
| Focal length of positive lens element 13': | 9.940 |
| Focal length of positive lens element 21': | 11.101 |
| Focal length of negative lens element 22': | −16.338 |
| Focal length of positive lens element 23': | 11.794 |
| Focal length of positive lens element 24': | 29.981 |

ASPHERICAL SURFACE DATA

| Surf. No. | K | A4 | A6 |
|---|---|---|---|
| 1 | −5.0000 | 6.74445E−04 | −1.28478E−04 |
| 2 | −1.0000 | −2.07452E−03 | −1.84053E−04 |
| 8 | 0.0000 | −3.62987E−04 | −8.25603E−06 |
| 9 | 0.0000 | 2.98836E−04 | −4.86348E−07 |
| 13 | 0.0000 | −2.24343E−04 | 7.92834E−06 |
| 14 | 0.0000 | −9.44740E−04 | 3.10349E−05 |

| Surf. No. | A8 | A10 | A12 |
|---|---|---|---|
| 1 | 5.10609E−06 | −8.99112E−08 | 6.18296E−10 |
| 2 | 2.48768E−05 | −1.15022E−06 | 3.76560E−08 |
| 8 | 2.16149E−06 | −1.63625E−07 | 4.38518E−09 |
| 9 | 4.51737E−07 | −3.74857E−08 | 1.02332E−09 |
| 13 | −9.21417E−07 | 2.42845E−08 | −5.14834E−10 |
| 14 | −2.06790E−06 | 5.09236E−08 | −5.82178E−10 |

TABLE 30

CURVATURE DATA

| Height H[mm] from Optical Axis | Radius of Curvature Ry[mm] | Curvature 1/Ry[mm] |
|---|---|---|
| Surface on object side of negative lens element 11' | | |
| 5.500 | −18.231 | −0.055 |
| 5.225 | −14.893 | −0.067 |
| 4.950 | −12.852 | −0.078 |
| 4.675 | −11.566 | −0.086 |
| 4.400 | −11.016 | −0.091 |
| 4.125 | −11.269 | −0.089 |
| 3.850 | −12.569 | −0.080 |
| 3.575 | −15.674 | −0.064 |
| 3.300 | −23.302 | −0.043 |
| 3.025 | −53.404 | −0.019 |
| 2.750 | 142.686 | 0.007 |
| 2.475 | 30.489 | 0.033 |
| 2.200 | 17.395 | 0.057 |
| 1.925 | 12.464 | 0.080 |
| 1.650 | 9.956 | 0.100 |
| 1.375 | 8.491 | 0.118 |
| 1.100 | 7.574 | 0.132 |
| 0.825 | 6.985 | 0.143 |
| 0.550 | 6.616 | 0.151 |
| 0.275 | 6.412 | 0.156 |
| 0.000 | 6.347 | 0.158 |
| Maximum Curvature: | | 0.158 |
| Minimum Curvature: | | −0.091 |
| Apv | | 0.248 |

TABLE 30-continued

CURVATURE DATA

| Height H[mm] from Optical Axis | Radius of Curvature Ry[mm] | Curvature 1/Ry[mm] |
|---|---|---|
| Image-side Surface of Positive Lens Element 24' | | |
| 4.730 | −3.314 | −0.302 |
| 4.494 | −4.022 | −0.249 |
| 4.257 | −4.967 | −0.201 |
| 4.021 | −6.238 | −0.160 |
| 3.784 | −7.978 | −0.125 |
| 3.548 | −10.415 | −0.096 |
| 3.311 | −13.936 | −0.072 |
| 3.075 | −19.267 | −0.052 |
| 2.838 | −27.969 | −0.036 |
| 2.602 | −44.263 | −0.023 |
| 2.365 | −85.137 | −0.012 |
| 2.129 | −381.167 | −0.003 |
| 2.053 | ∞(Inflection Point) | 0.000 |
| 1.892 | 190.635 | 0.005 |
| 1.656 | 82.009 | 0.012 |
| 1.419 | 54.320 | 0.018 |
| 1.183 | 41.753 | 0.024 |
| 0.946 | 34.761 | 0.029 |
| 0.710 | 30.540 | 0.033 |
| 0.473 | 27.987 | 0.036 |
| 0.237 | 26.604 | 0.038 |
| 0.000 | 26.164 | 0.038 |
| Maximum Curvature: | 0.038 | |
| Minimum Curvature: | −0.302 | |
| Bpv | 0.340 | |

Numerical Embodiment 7

Figure 13:
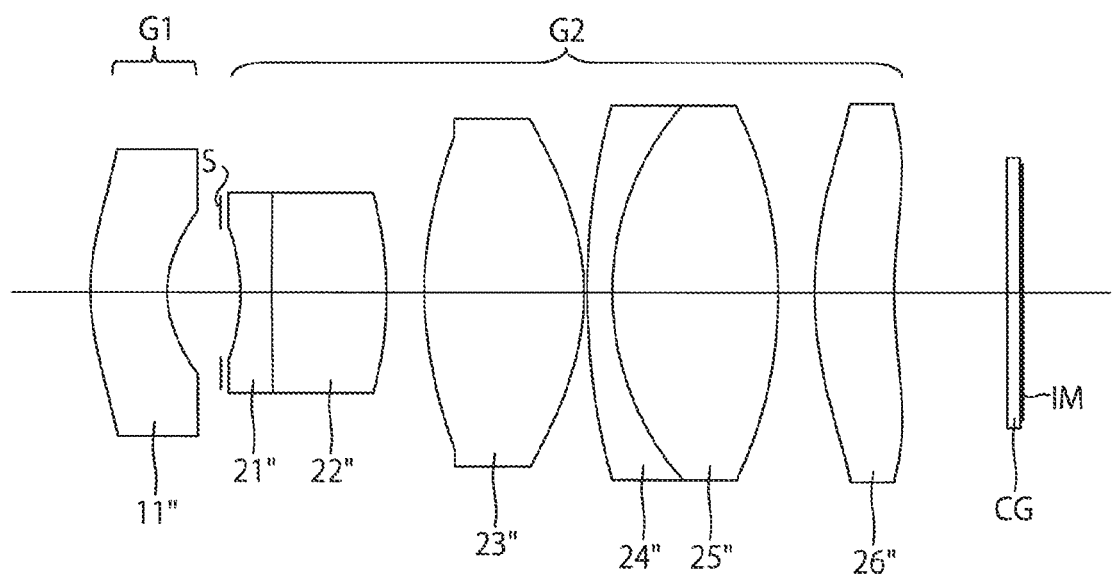
FIG. 13 shows a lens arrangement of a seventh numerical embodiment of the imaging optical system.
Figures 14A, 14B, 14C, 14D:
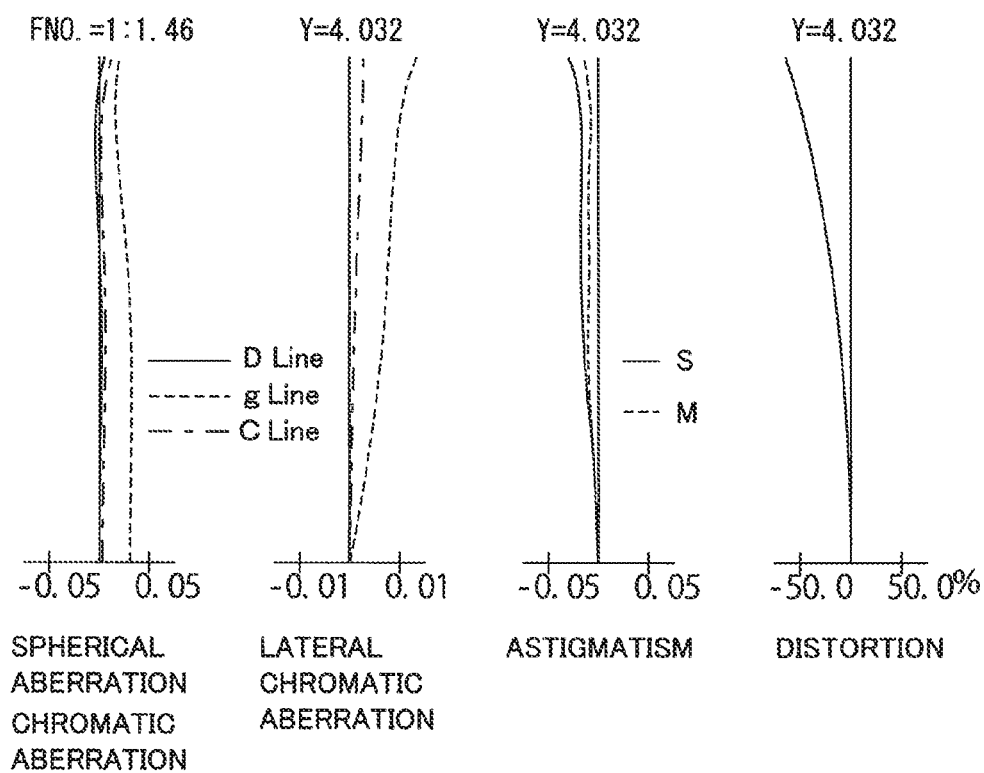
FIGS. 14A, 14B, 14C and 14D show various aberrations that occurred in the lens arrangement of FIG. 13.

FIGS. 13 through 14D and Tables 31 through 35 show a seventh numerical embodiment of the imaging optical system. FIG. 13 shows a lens arrangement of the imaging optical system. FIGS. 14A, 14B, 14C and 14D show various aberrations that occurred in the imaging optical system of FIG. 13. Table 31 indicates the surface data, Table 32 indicates various lens system data, Table 33 indicates focal length data, Table 34 indicates aspherical surface data, and Table 35 indicates curvature data.

The imaging optical system of the seventh numerical embodiment is configured of a negative first lens group G1, a diaphragm (axial light-bundle restriction diaphragm/aperture diaphragm) S, and a positive second lens group G2, in that order from the object side. A cover glass CG is provided between the second lens group G2 and an imaging surface IM.

The first lens group G1 is configured of a negative single lens element 11". An aspherical surface is formed on each side of the negative single lens element 11". The object side of the negative single lens element 11" includes a paraxial convex surface convexing toward the object side (the paraxial curvature has a positive value), and includes a peripheral surface having a curvature that is less than the curvature of the paraxial convex surface.

The second lens group G2 is configured of a negative lens element 21", a positive lens element 22", a positive lens element 23", a negative lens element 24", a positive lens element 25", and a positive lens element 26", in that order from the object side. An aspherical surface is formed on each side of the positive lens element 23", and an aspherical surface is formed on each side of the positive lens element 26". The negative lens element 21" and the positive lens element 22" are cemented to each other, and the negative lens element 24" and the positive lens element 25" are cemented to each other. The image side of the positive lens element 26" includes a paraxial concave surface concaving toward the image side (the paraxial curvature has a positive value), and includes a peripheral surface having an inflection point that changes from a positive value of the paraxial curvature to a negative value. A second diaphragm is provided between the positive lens element 22" and the positive lens element 23". The second diaphragm is omitted from the drawings and is only indicated in the lens data.

TABLE 31

SURFACE DATA

| Surf. No. | r | d | N(d) | vd | Effective Aperture |
|---|---|---|---|---|---|
| 1* | 7.049 | 2.439 | 1.83400 | 37.3 | 4.50 |
| 2* | 3.148 | 1.697 | | | 2.57 |
| 3(Diaphragm) | ∞ | 0.625 | | | 2.02 |
| 4 | −5.955 | 1.000 | 1.51680 | 64.2 | 2.08 |
| 5 | 277.199 | 3.615 | 2.05090 | 26.9 | 2.48 |
| 6 | −11.665 | −0.329 | | | 3.13 |
| 7(Diaphragm) | ∞ | 1.536 | | | 3.15 |
| 8* | 11.211 | 5.103 | 1.49710 | 81.6 | 4.92 |
| 9* | −7.749 | 0.100 | | | 5.46 |
| 10 | 22.395 | 0.800 | 1.98613 | 16.5 | 5.71 |
| 11 | 8.832 | 5.278 | 1.49710 | 81.6 | 5.55 |
| 12 | −13.696 | 1.135 | | | 5.88 |
| 13* | 11.633 | 2.500 | 1.80610 | 40.7 | 5.94 |
| 14* | 13.861 | 3.555 | | | 5.82 |
| 15 | ∞ | 0.400 | 1.51680 | 64.2 | 4.24 |
| 16 | ∞ | 0.045 | | | 4.13 |
| IM(Imaging Surface) | | | | | |

The asterisk (*) designates an aspherical surface which is rotationally symmetrical with respect to the optical axis.

TABLE 32

VARIOUS LENS SYSTEM DATA

| f | 5.800 |
|---|---|
| FNO. | 1.46 |
| W | 60.0 |
| Y | 4.032 |

TABLE 33

FOCAL LENGTH DATA

| Focal length of first lens group G1: | −9.528 |
|---|---|
| Focal length of second lens group G2: | 6.344 |
| Focal length of negative lens element 11": | −9.528 |
| Focal length of negative lens element 21": | −11.267 |
| Focal length of positive lens element 22": | 10.720 |
| Focal length of positive lens element 23": | 10.122 |
| Focal length of negative lens element 24": | −15.234 |
| Focal length of positive lens element 25": | 11.713 |
| Focal length of positive lens element 26": | 59.828 |

TABLE 34

ASPHERICAL SURFACE DATA

| Surf. No. | K | A4 | A6 |
|---|---|---|---|
| 1 | −5.0000 | −7.45235E−06 | −8.86530E−05 |
| 2 | −1.0000 | −2.00355E−03 | 2.76447E−05 |
| 8 | 0.0000 | −4.80544E−04 | 1.18067E−05 |
| 9 | 0.0000 | 3.90951E−04 | 6.28772E−06 |
| 13 | 0.0000 | −4.50960E−04 | 1.33152E−05 |
| 14 | 0.0000 | −1.80547E−03 | 5.19193E−05 |

TABLE 34-continued

ASPHERICAL SURFACE DATA

| Surf. No. | A8 | A10 | A12 |
|---|---|---|---|
| 1 | 4.60034E−06 | −8.69499E−08 | 4.66106E−10 |
| 2 | −1.68570E−05 | 5.59630E−06 | −3.42047E−07 |
| 8 | −4.04222E−07 | 1.26446E−08 | −1.25242E−10 |
| 9 | −9.41114E−08 | 1.22979E−09 | 7.97578E−11 |
| 13 | −4.55111E−07 | 4.11886E−10 | 8.04234E−11 |
| 14 | −1.86995E−06 | 3.72041E−08 | −2.81109E−10 |

TABLE 35

CURVATURE DATA

| Height H[mm] from Optical Axis | Radius of Curvature Ry[mm] | Curvature 1/Ry[mm] |
|---|---|---|
| Surface on object side of negative lens element 11″ | | |
| 4.500 | −40.609 | −0.025 |
| 4.275 | −37.710 | −0.027 |
| 4.050 | −32.250 | −0.031 |
| 3.825 | −29.279 | −0.034 |
| 3.600 | −29.600 | −0.034 |
| 3.375 | −34.380 | −0.029 |
| 3.150 | −49.535 | −0.020 |
| 2.925 | −128.610 | −0.008 |
| 2.700 | 138.736 | 0.007 |
| 2.475 | 42.066 | 0.024 |
| 2.250 | 24.389 | 0.041 |
| 2.025 | 17.207 | 0.058 |
| 1.800 | 13.426 | 0.074 |
| 1.575 | 11.159 | 0.090 |
| 1.350 | 9.696 | 0.103 |
| 1.125 | 8.709 | 0.115 |
| 0.900 | 8.032 | 0.125 |
| 0.675 | 7.571 | 0.132 |
| 0.450 | 7.272 | 0.138 |
| 0.225 | 7.103 | 0.141 |
| 0.000 | 7.049 | 0.142 |
| Maximum Curvature: | | 0.142 |
| Minimum Curvature: | | −0.034 |
| Apv | | 0.176 |
| Image-side Surface of Positive Lens Element 26″ | | |
| 5.820 | −6.768 | −0.148 |
| 5.529 | −6.356 | −0.157 |
| 5.238 | −6.086 | −0.164 |
| 4.947 | −6.115 | −0.164 |
| 4.656 | −6.479 | −0.154 |
| 4.365 | −7.211 | −0.139 |
| 4.074 | −8.382 | −0.119 |
| 3.783 | −10.129 | −0.099 |
| 3.492 | −12.725 | −0.079 |
| 3.201 | −16.754 | −0.060 |
| 2.910 | −23.719 | −0.042 |
| 2.619 | −38.809 | −0.026 |
| 2.328 | −98.279 | −0.010 |
| 2.132 | ∞(Inflection Point) | 0.000 |
| 2.037 | 205.644 | 0.005 |
| 1.746 | 51.587 | 0.019 |
| 1.455 | 30.140 | 0.033 |
| 1.164 | 21.835 | 0.046 |
| 0.873 | 17.658 | 0.057 |
| 0.582 | 15.382 | 0.065 |
| 0.291 | 14.220 | 0.070 |
| 0.000 | 13.861 | 0.072 |
| Maximum Curvature: | | 0.072 |
| Minimum Curvature: | | −0.164 |
| Bpv | | 0.236 |

Numerical Embodiment 8

Figure 15:
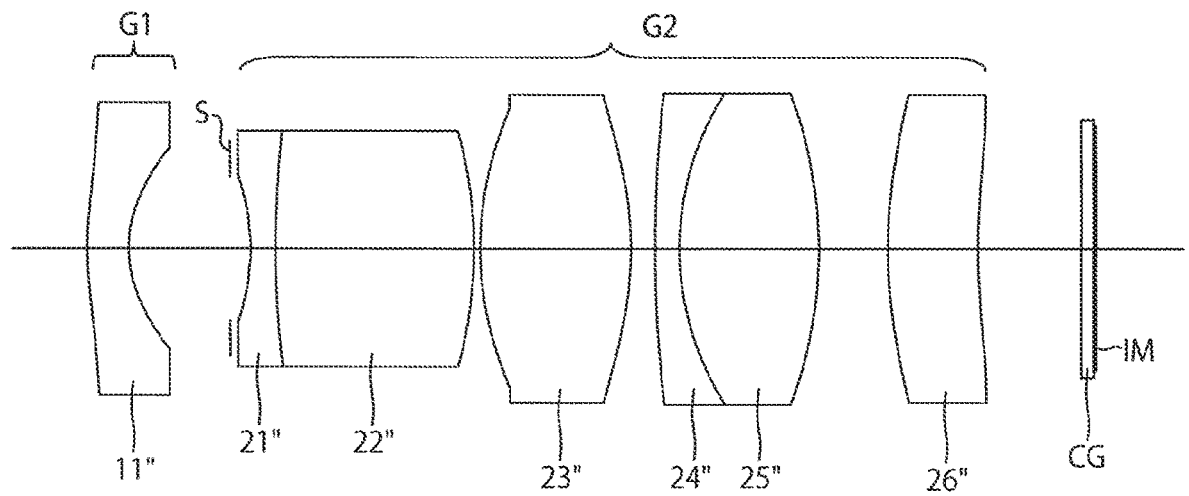
FIG. 15 shows a lens arrangement of an eighth numerical embodiment of the imaging optical system.
Figures 16A, 16B, 16C, 16D:
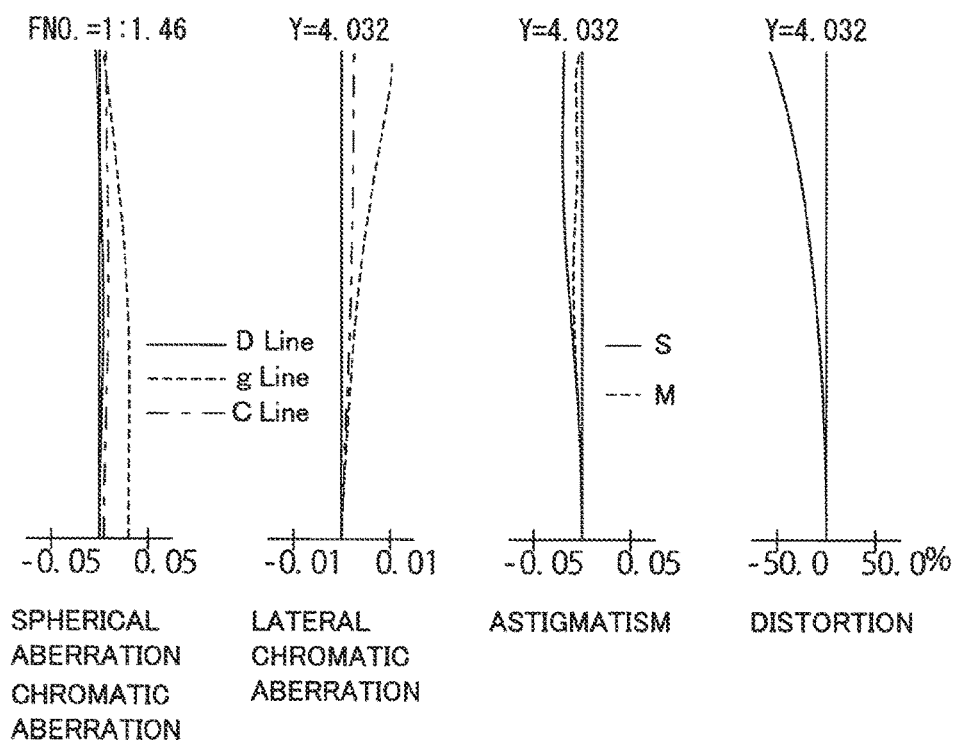
FIGS. 16A, 16B, 16C and 16D show various aberrations that occurred in the lens arrangement of FIG. 15.

FIGS. 15 through 16D and Tables 36 through 40 show an eighth numerical embodiment of the imaging optical system. FIG. 15 shows a lens arrangement of the imaging optical system. FIGS. 16A, 16B, 16C and 16D show various aberrations that occurred in the imaging optical system of FIG. 15. Table 36 indicates the surface data, Table 37 indicates various lens system data, Table 38 indicates focal length data, Table 39 indicates aspherical surface data, and Table 40 indicates curvature data.

The lens arrangement of the eighth numerical embodiment is the same as that of the seventh numerical embodiment.

TABLE 36

SURFACE DATA

| Surf. No. | r | d | N(d) | vd | Effective Aperture |
|---|---|---|---|---|---|
| 1* | 10.400 | 1.360 | 1.77377 | 47.2 | 4.75 |
| 2* | 3.662 | 3.320 | | | 3.27 |
| 3(Diaphragm) | ∞ | 0.660 | | | 2.33 |
| 4 | −7.180 | 0.820 | 1.51742 | 52.2 | 2.39 |
| 5 | 32.300 | 6.510 | 2.00100 | 29.1 | 2.76 |
| 6 | −14.150 | −0.430 | | | 3.84 |
| 7(Diaphragm) | ∞ | 0.630 | | | 3.85 |
| 8* | 10.350 | 5.000 | 1.49710 | 81.6 | 4.54 |
| 9* | −11.020 | 0.790 | | | 5.00 |
| 10 | 42.800 | 0.800 | 1.94595 | 18.0 | 4.86 |
| 11 | 9.300 | 4.560 | 1.55032 | 75.5 | 4.78 |
| 12 | −14.270 | 2.250 | | | 5.06 |
| 13* | 17.370 | 2.930 | 1.83441 | 37.3 | 5.00 |
| 14* | 25.210 | 3.353 | | | 4.75 |
| 15 | ∞ | 0.400 | 1.51680 | 64.2 | 4.19 |
| 16 | ∞ | 0.045 | | | 4.14 |
| IM(Imaging Surface) | | | | | |

The asterisk (*) designates an aspherical surface which is rotationally symmetrical with respect to the optical axis.

TABLE 37

VARIOUS LENS SYSTEM DATA

| f | 4.935 |
|---|---|
| FNO. | 1.46 |
| W | 60.0 |
| Y | 4.032 |

TABLE 38

FOCAL LENGTH DATA

| Focal length of first lens group G1: | −8.010 |
|---|---|
| Focal length of second lens group G2: | 7.091 |
| Focal length of negative lens element 11″: | −8.010 |
| Focal length of negative lens element 21″: | −11.273 |
| Focal length of positive lens element 22″: | 10.571 |
| Focal length of positive lens element 23″: | 11.641 |
| Focal length of negative lens element 24″: | −12.708 |
| Focal length of positive lens element 25″: | 10.986 |
| Focal length of positive lens element 26″: | 57.213 |

TABLE 39

ASPHERICAL SURFACE DATA

| Surf. No. | K | A4 | A6 |
|---|---|---|---|
| 1 | −8.0000 | −2.25690E−03 | 1.07030E−04 |
| 2 | −1.0000 | −3.10640E−03 | 2.43710E−04 |
| 8 | 0.0000 | −2.18740E−04 | 3.67650E−06 |
| 9 | 0.0000 | 4.30190E−04 | −8.43370E−07 |
| 13 | 0.0000 | 7.25840E−05 | −7.24050E−06 |
| 14 | 0.0000 | −1.49750E−04 | −1.08760E−05 |

TABLE 39-continued

ASPHERICAL SURFACE DATA

| Surf. No. | A8 | A10 | A12 |
|---|---|---|---|
| 1 | −3.04370E−06 | 5.47400E−08 | −4.72880E−10 |
| 2 | −8.55840E−06 | 2.85190E−07 | 5.71410E−09 |
| 8 | −9.60400E−08 | 3.24900E−09 | −1.45510E−11 |
| 9 | 8.60370E−08 | −2.63230E−09 | 8.56940E−11 |
| 13 | 6.28970E−08 | −6.07590E−09 | 1.74850E−10 |
| 14 | −1.96590E−07 | 6.24070E−09 | 1.18040E−10 |

TABLE 40

CURVATURE DATA

| Height H[mm] from Optical Axis | Radius of Curvature Ry[mm] | Curvature 1/Ry[mm] |
|---|---|---|
| Surface on object side of negative lens element 11" | | |
| 4.750 | 411.159 | 0.002 |
| 4.513 | −287.811 | −0.003 |
| 4.275 | −93.288 | −0.011 |
| 4.038 | −56.236 | −0.018 |
| 3.800 | −41.979 | −0.024 |
| 3.563 | −35.325 | −0.028 |
| 3.325 | −32.424 | −0.031 |
| 3.088 | −32.173 | −0.031 |
| 2.850 | −34.766 | −0.029 |
| 2.613 | −42.146 | −0.024 |
| 2.375 | −62.651 | −0.016 |
| 2.138 | −177.447 | −0.006 |
| 1.900 | 145.128 | 0.007 |
| 1.663 | 47.464 | 0.021 |
| 1.425 | 27.637 | 0.036 |
| 1.188 | 19.464 | 0.051 |
| 0.950 | 15.221 | 0.066 |
| 0.713 | 12.792 | 0.078 |
| 0.475 | 11.380 | 0.088 |
| 0.238 | 10.634 | 0.094 |
| 0.000 | 10.400 | 0.096 |
| Maximum Curvature: | | 0.096 |
| Minimum Curvature: | | −0.031 |
| Apv | | 0.127 |
| Image-side Surface of Positive Lens Element 26" | | |
| 4.750 | −18.330 | −0.055 |
| 4.513 | −13.881 | −0.072 |
| 4.275 | −13.692 | −0.073 |
| 4.038 | −15.478 | −0.065 |
| 3.800 | −19.396 | −0.052 |
| 3.563 | −27.047 | −0.037 |
| 3.325 | −44.036 | −0.023 |
| 3.088 | −102.365 | −0.010 |
| 2.882 | ∞(Inflection Point) | 0.000 |
| 2.850 | 715.513 | 0.001 |
| 2.613 | 93.590 | 0.011 |
| 2.375 | 54.990 | 0.018 |
| 2.138 | 41.505 | 0.024 |
| 1.900 | 34.909 | 0.029 |
| 1.663 | 31.170 | 0.032 |
| 1.425 | 28.879 | 0.035 |
| 1.188 | 27.418 | 0.036 |
| 0.950 | 26.470 | 0.038 |
| 0.713 | 25.859 | 0.039 |
| 0.475 | 25.481 | 0.039 |
| 0.238 | 25.275 | 0.040 |
| 0.000 | 25.210 | 0.040 |
| Maximum Curvature: | | 0.040 |
| Minimum Curvature: | | −0.073 |
| Bpv | | 0.113 |

The numerical values of each condition for each embodiment are shown in Table 41.

TABLE 41

| | Embod. 1 | Embod. 2 | Embod. 3 | Embod. 4 |
|---|---|---|---|---|
| Condition(1) | 0.237 | 0.230 | 0.219 | 0.214 |
| Condition(2) | 0.427 | 0.397 | 0.390 | 0.487 |
| Condition(3) | 0.757 | 0.761 | 0.839 | 0.778 |
| Condition(4) | 1.272 | 0.753 | 0.694 | 1.050 |
| Condition(5) | 0.595 | 1.011 | 1.209 | 0.741 |
| Condition(6) | 0.067 | 0.068 | 0.064 | 0.062 |
| | Embod. 5 | Embod. 6 | Embod. 7 | Embod. 8 |
| Condition(1) | 0.295 | 0.298 | 0.140 | 0.142 |
| Condition(2) | 0.394 | 0.434 | 0.366 | 0.607 |
| Condition(3) | 1.108 | 1.366 | 0.792 | 0.604 |
| Condition(4) | 1.867 | 1.608 | 1.376 | 0.535 |
| Condition(5) | 0.594 | 0.849 | 0.576 | 1.129 |
| Condition(6) | 0.096 | 0.090 | 0.083 | 0.041 |

As can be understood from Table 41, the first through eighth embodiments satisfy conditions (1) through (6). Furthermore, as can be understood from the aberration diagrams, the various aberrations are suitably corrected.

Obvious changes may be made in the specific embodiments of the present disclosure described herein, such modifications being within the spirit and scope of the invention claimed. It is indicated that all matter contained herein is illustrative and does not limit the scope of the invention.

What is claimed is:

1. An imaging optical system comprising a negative first lens group, at least one axial light-bundle restriction diaphragm, and a positive second lens group, in that order from the object side,
    wherein the first lens group comprises a negative lens element provided closest to the object side,
    wherein a surface on the object side of the negative lens element, provided closest to the object side within the first lens group, includes a paraxial convex surface convexing toward the object side and includes a peripheral surface having a curvature that is less than the curvature of the paraxial convex surface,
    wherein a surface on the image side of the lens element, provided closest to the image side within the second lens group, includes a paraxial concave surface concaving toward the image side and includes a peripheral surface having an inflection point that changes from a positive value of the curvature of the paraxial concave convex surface to a negative value, and
    wherein the following conditions (1) and (2) are satisfied:
    $0.10 < La/TL < 0.31$ ... (1), and
    $0.35 < Bh < 0.70$ ... (2), wherein
    La designates a distance along the optical axis from the surface on the object side of the negative lens element, provided closest to the object side within the first lens group, to the axial light-bundle restriction diaphragm that is provided closest to the object side,
    TL designates a distance along the optical axis from the surface on the object side of the negative lens element, provided closest to the object side within the first lens group, to an imaging surface, and
    Bh designates a value of a height from an optical axis to a point of inflection on the image side surface of a lens element that is provided closest to the image side within the second lens group, divided by the effective radius of the surface on the image side of the lens element that is provided closest to the image side.

2. The imaging optical system according to claim 1, wherein the following conditions (3), (4) and (5) are satisfied:

$0.5 < Apv*Ha < 1.5$ ... (3),
$0.45 < Bpv*Hb < 1.90$ ... (4), and
$0.45 < Apv/Bpv < 1.25$ ... (5), wherein Apv designates an amount of curvature change in the meridional plane within the effective aperture of the surface on the object side of the negative lens element that is provided closest to the object side within the first lens group, Bpv designates an amount of curvature change in the meridional plane within the effective aperture of the surface on the image side of the lens element that is provided closest to the image side within the second lens group, Ha designates the effective radius of the surface on the object side of the negative lens element that is provided closest to the object side within the first lens group, and Hb designates the effective radius of the surface on the image side of the lens element that is provided closest to the image side within the second lens group.

3. The imaging optical system according to claim 1, wherein the following condition (6) is satisfied:

$0.035 < L1D/TL < 0.12$ ... (6), wherein

L1D designates a thickness along the optical axis of the negative lens element that is provided closest to the object side within the first lens group, and TL designates a distance along the optical axis from the surface on the object side of the negative lens element, provided closest to the object side within the first lens group, to an imaging surface.

4. The imaging optical system according to claim 1, wherein a negative lens element including a concave surface on the object side, and having a negative refractive power that is weaker than that of the negative lens element that is provided closest to the object side within the first lens group, is provided on the image side of the negative lens element that is provided closest to the object side within the first lens group.

5. The imaging optical system according to claim 1, wherein the first lens group consists of a negative lens element and a negative lens element, in that order from the object side, and wherein the second lens group consists of a positive lens element, a positive lens element, a negative lens element, a positive lens element and a positive lens element, in that order from the object side.

6. The imaging optical system according to claim 1, wherein the first lens group consists of a negative lens element, a negative lens element and a positive lens element, in that order from the object side, and wherein the second lens group consists of a positive lens element, a negative lens element, a positive lens element and a positive lens element, in that order from the object side.

7. The imaging optical system according to claim 6, wherein the negative lens element on the image side within the first lens group, and the positive lens element within the first lens group are cemented to each other.

8. The imaging optical system according to claim 1, wherein the first lens group consists of a negative single lens element, and wherein the second lens group consists of a negative lens element, a positive lens element, a positive lens element, a negative lens element, a positive lens element and a positive lens element, in that order from the object side.

9. The imaging optical system according to claim 8, wherein the negative lens element provided closest to the object side within the second lens group and the positive lens element, which is the second lens element within the second lens group, are cemented to each other.

* * * * *